US010198635B2

United States Patent
Chen et al.

(10) Patent No.: US 10,198,635 B2
(45) Date of Patent: Feb. 5, 2019

(54) SYSTEMS AND METHODS FOR ASSOCIATING AN IMAGE WITH A BUSINESS VENUE BY USING VISUALLY-RELEVANT AND BUSINESS-AWARE SEMANTICS

(71) Applicant: FUJI XEROX CO., LTD., Tokyo (JP)

(72) Inventors: Bor-Chun Chen, Hyattsville, MD (US); Yin-Ying Chen, Sunnyvale, CA (US); Francine R. Chen, Menlo Park, CA (US); Dhiraj Joshi, Fremont, CA (US)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/001,130

(22) Filed: Jan. 19, 2016

(65) Prior Publication Data
US 2017/0206416 A1   Jul. 20, 2017

(51) Int. Cl.
*G06K 9/00* (2006.01)
*G06F 17/30* (2006.01)
(Continued)

(52) U.S. Cl.
CPC ... *G06K 9/00671* (2013.01); *G06F 17/30244* (2013.01); *G06F 17/30265* (2013.01);
(Continued)

(58) Field of Classification Search
None
See application file for complete search history.

(56) References Cited

U.S. PATENT DOCUMENTS

| | | | |
|---|---|---|---|
| 2009/0092322 A1* | 4/2009 | Erol | G06K 9/00442 382/224 |
| 2012/0033655 A1* | 2/2012 | Tang | H04N 1/00281 370/338 |
| 2017/0109615 A1* | 4/2017 | Yatziv | G06F 17/30241 |

OTHER PUBLICATIONS

Adam Sadilek, Henry Kautz, and Jeffrey P Bigham. Finding your friends and following them to where you are. In WSDM, pp. 723-732. ACM, 2012, (10 pgs.).
(Continued)

*Primary Examiner* — Sumati Lefkowitz
*Assistant Examiner* — Jiangeng Sun
(74) *Attorney, Agent, or Firm* — Morgan, Lewis & Bockius LLP

(57) ABSTRACT

Systems and methods disclosed herein associate images with business venues. An example method includes: receiving a first image and retrieving textual reviews and stored images that are associated with one or more candidate business venues. The method further includes: detecting, using trained visual detectors, a plurality of business-aware concepts in the first image and assessing likelihood that detected business-aware concepts are in the first image. The method additionally includes: (i) generating a first representation of the first image based on the likelihoods and one or more term vectors for high-scoring concepts and (ii) receiving second representations of each candidate based on the retrieved textual reviews and stored images. In accordance with determining that the first representation is most similar to a respective second representation of a first candidate, the method includes: (i) associating the first image with the first candidate and (ii) providing an indication of the association.

20 Claims, 12 Drawing Sheets
(7 of 12 Drawing Sheet(s) Filed in Color)

(51) Int. Cl.
G06Q 50/00 (2012.01)
G06T 7/00 (2017.01)
G06Q 30/02 (2012.01)
(52) U.S. Cl.
CPC ..... *G06K 9/00691* (2013.01); *G06K 9/00697* (2013.01); *G06Q 30/0282* (2013.01); *G06Q 50/01* (2013.01); *G06T 7/00* (2013.01); *G06T 2207/20081* (2013.01); *G06T 2207/20084* (2013.01)

(56) References Cited

OTHER PUBLICATIONS

Adam Sadilek, Henry A Kautz, and Vincent Silenzio. Predicting disease transmission from geo-tagged micro-blog data. In AAAI, Proceedings of the Twenty Sixth Conference on Artificial Intelligence, 2012, (7 pgs.).
Al Hasan, A Survey of Link Prediction in Social Networks, Dept. of Computer and Information Science Indiana Univ., 2011, (33 pgs.).
Benjamin P Wing and Jason Baldridge. Simple supervised document geolocation with geodesic grids. In ACL, pp. 955-964. Association for Computational Linguistics, 2011, (10 pgs.).
Bo Han, Paul Cook, and Timothy Baldwin. Text-based Twitter user geolocation prediction, Journal of Artificial Intelligence Research, 49:451 500, 2014, (50 pgs.).
Bokai Cao, Xiangnan Kong, and Philip S Yu. Collective prediction of multiple types of links in heterogeneous information networks. In ICDM. IEEE, 2014, (10 pgs.).
Brent Hecht, Lichan Hong, Bongwon Suh, and Ed H Chi. Tweets from Justin Bieber's heart: the dynamics of the location field in user profiles. In CHI, pp. 237 246. ACM, 2011, (10 pgs.).
Chenliang Li and Aixin Sun. Fine-grained location extraction from tweets with temporal awareness. In SIGIR, pp. 43-52. ACM, 2014, (24 pgs).
Clodoveu A Davis Jr, Gisele L Pappa, Diogo Renno Rocha de Oliveira, and Filipe de L Arcanjo. Inferring the location of Twitter messages based on user relationships. Transactions in GIS, 15(6):735 751, 2011, (26 pgs.).
Dmytro Karamshuk, Anastasios Noulas, Salvatore Scellato, Vincenzo Nicosia, and Cecilia Mascolo. Ceo-spotting: mining online location-based services for optimal retail store placement. In KDD, pp. 793-801. ACM, 2013, (22 pgs.).
Eunjoon Cho, Seth A Myers, and Jure Leskovec. Friendship and mobility: user movement in location-based social networks. In KDD, pp. 1082 1090, ACM, 2011, (9 pgs.).
Flatow, On the Accuracy of Hyper-Local Geotagging of Social Media Content, arXiv:1409, 146v2 [cs.IR], WSDM'15, Feb. 2-6, 2015, (10 pgs.).
Francine Chen, Dhiraj Joshi, Yasuhide Miura, and Tomoko Ohkuma. Social media-based profiling of business locations. In GeoMM. ACM, 2014, (6 pgs.).
Jacob Eisenstein, Brendan O'Connor, Noah A Smith, and Eric P Xing. A latent variable model for geographic lexical variation. In EMNLP, pp. 1277 1287. ACL, 2010, (11 pgs.).
Jalal Mahmud, Jeffrey Nichols, and Clemens Drews. Where is this tweet from? Inferring home locations of Twitter users. In ICWSM, 2012, (4 pgs.).
Jiawei Zhang, Xiangnan Kong, and Philip S Yu. Transferring heterogeneous links across location-based social networks. In WSDM, pp. 303 312. ACM, 2014, (10 pgs.).
Lars Backstrom, Eric Sun, and Cameron Marlow. Find me if you can: improving geographical prediction with social and spatial proximity. In WWW, pp. 61-70, ACM, 2010, (10 pgs.).
Li, Fine-Grained Location Extraction from Tweets with Temporal Awareness, SIGIR'14, Jul. 6-11, 2014, (10 pgs.).
Liangjie Hong, Amr Ahmed, Siva Gurumurthy, Alexander J Smola, and Kostas Tsioutsiouliklis. Discovering geographical topics in the Twitter stream. In WWW, pp. 769-778. ACM, 2012, (10 pgs.).
Liben-Nowell, The Link-Prediction Problem for Social Networks, Wiley InterScience Discover Something Great, Dept. of Computer Science, Carleton College, Aug. 25, 2006, (13 pgs.).
Miller McPherson, Lynn Smith-Lovin, and James M Cook. Birds of a feather: Homophily in social networks. Annual review of sociology, pp. 415-444, 2001, (31 pgs.).
Nan Lin. Social networks and status attainment. Annual review of sociology, pp. 467-487, 1999, (21 pgs.).
Rakesh, Location-Specific Tweet Detection and Topic Summarization in Twitter, 2013 IEEE/ACM International Conf. on Advances in Social Networks Analysis and Mining, Aug. 25-28, 2013, (4 pgs.).
Sheila Kinsella, Vanessa Murdock, and Neil O'Hare. I'm eating a sandwich in Glasgow: modeling locations with tweets. In SMUG, pp. 61 68. ACM, 2011, (8 pgs.).
Takeshi Sakaki, Makoto Okazaki, and Yutaka Matsuo. Earthquake shakes Twitter users: real-time event detection by social sensors. In WWW, pp. 851 860. ACM, 2010, (10 pgs.).
Wen Li, Pavel Serdyukov, Arjen P de Vries, Carsten Eickhoff, and Martha Larson. The where in the tweet. In CIKM, pp. 2473-2476. ACM, 2011, (4 pgs.).
Xiangnan Kong, Bokai Cao, and Philip S Yu. Multi-label classification by mining label and instance correlations from heterogeneous information networks. In KDD, pp. 614 622. ACM, 2013, (9 pgs.).
Xia Wang, Ming Xu, Yizhi Ren, Jian Xu, Haiping Zhang, and Ning Zheng. A location inferring model based on tweets and bilateral follow friends. Journal of Computers, 9(2):315 321, 2014, (8 pgs.).
Yizhou Sun, Brandon Norick, Jiawei Han, Xifeng Yan, Philip S Yu, and Xiao Yu. Integrating meta-path selection with user-guided object clustering in heterogeneous information networks. In KDD, pp. 1348-1356. ACM, 2012, (9 pgs.).
Yizhou Sun, Jiawei Han, Xifeng Yan, Philip S Yu, and Tianyi Wu. Pathsim: Meta path-based top-k similarity search in heterogeneous information networks. In VLDB, 2011, (12 pgs.).
Yohei Ikawa, Miki Enoki, and Michiaki Tatsubori. Location inference using microblog messages. In WWW {Companion), pp. 687690. ACM, 2012, (14 pgs.).
Zhang, Meta-path based Multi-Network Collective Link Prediction, in KDD'14. Aug. 24-27, 2014, (10 pgs).
Zhiyuan Cheng, James Caverlee, and Kyumin Lee. You are where you tweet: a content-based approach to geo-locating Twitter users. In CIKM, pp. 759-768, ACM, 2010, (10 pgs.).

\* cited by examiner

| Method | Acc.@2 | Acc.@5 |
|---|---|---|
| Random Guess | 50.0% | 20.0% |
| WordVec (Google News) | 65.8% | 39.1% |
| WordVec (Business-Aware) | 69.1% | 42.3% |
| BA-CNN (C+V) + WordVec | 78.5% | 56.1% |

SYSTEMS AND METHODS FOR ASSOCIATING AN IMAGE WITH A BUSINESS VENUE BY USING VISUALLY-RELEVANT AND BUSINESS-AWARE SEMANTICS

RELATED APPLICATIONS

This application is related to U.S. patent application Ser. No. 14/664,734, filed Mar. 20, 2015, entitled "Methods and Systems of Venue Inference for Social Messages," and to U.S. patent application Ser. No. 14/835,624, filed Aug. 25, 2015, entitled "Venue Link Detection for Social Media Messages," each of which is incorporated herein by reference in its entirety.

TECHNICAL FIELD

The present application is generally related to business venue recognition in images and, more specifically, to associating an image with a business venue at which the image was taken by using visually-relevant and business-aware semantics.

BACKGROUND

Social platforms (e.g., Twitter) and other media-sharing applications (e.g., Instagram) are popular for sharing activities, thoughts, opinions, and images. Geo-tagging of social media messages and images (e.g., associating a physical location or venue with a tweet or a particular image) enables applications to personalize a user's experience based on location information. However, due to privacy concerns, only a small percentage of users choose to publicize their location when they post social media messages or when they take a photo at a particular business venue, and others reveal the locations of their messages/photos only occasionally. Because only a small proportion of images are explicitly geotagged to a location, determining a business venue at which an image was taken (e.g., by identifying concepts in the image) can be useful.

Conventional implementations for identifying geographic locations corresponding to images can be roughly categorized into two groups based on the techniques used for geo-locating: (1) use of coarse-grain locations; and (2) comparison of an image with database images. Some applications attempt to infer coarse-grain locations and provide no indication as to a specific business venue at which an image was taken. Other applications attempt to rely only on database images to match an image with a particular location. These other applications do not take into account textual-based data (e.g., reviews about business venues) and, these other applications fail to work when no database images are available for a particular location. Furthermore, yet other applications rely on low-level visual patterns and do not attempt to recognize visually significant concepts in images and, thus, these yet other applications often cannot differentiate between general consumer images that do not have distinct low-level visual patterns.

Associating an image with a specific business venue at which the image was taken can facilitate better understanding of an image's (or a user associated with the image) geographic context, which can enable better inference of a geographic intent in search queries, more appropriate placement of advertisements, and display of information about events, points of interest, and people in the geographic vicinity of the user. Therefore, there is a need for implementations that address the deficiencies identified above in order to accurately associate images with business venues at which they were taken (e.g., by utilizing text-based reviews and stored images to identify business-aware concepts in images).

SUMMARY

Various implementations of systems, methods, and devices within the scope of the appended claims each have several aspects, no single one of which is solely responsible for the attributes described herein. Without limiting the scope of the appended claims, after considering this disclosure, and particularly after considering the section entitled "Description of Implementations" one will understand how the aspects of various implementations are used to enable computing devices to associate an image with a business venue (e.g., a business venue at which the image was taken) by using visually-relevant and business-aware semantics.

Disclosed implementations provide methods for accurately associating images with business venues (even in the face of sparse data availability for the business venue, such as no images available that are associated with the business venue). In general, the disclosed implementations efficiently utilize both text-based reviews (e.g., Yelp reviews) and stored images (e.g., images from Instagram, Yelp, and other similar social media services, that are already associated with a business venue) to create a framework that accurately associates images with business venues at which the images were taken. For example, the framework includes mining semantic concepts (also referred to herein as business-aware concepts) from textual reviews of business venues. The semantic concepts are carefully selected to include business-aware, visually detectable, and discriminative terms that can be used for business venue recognition purposes. The framework also includes (i) training visual detectors to identify the semantic concepts in query images (e.g., images that are not yet associated with business venues) and (ii) using word representation models (example word representation models are discussed below in reference to FIG. 4A) to convert a respective semantic concept to a word representation (also referred to herein as a "word vector" or a "term vector"). After identifying the semantic concepts, a representation of a respective query image (e.g., the representation includes a vector of scores that reflect likelihood that a semantic concept is present in the respective query image and a word representation for high-scoring semantic concepts) can be compared to representations of candidate business venues, in order to identify a most similar business venue for the respective query image. In one experiment, visual concepts detected in accordance with the implementations described herein (e.g., using the disclosed business-aware convolutional neural network, herein termed "BA-CNN") achieved up to 22.5% improvement for business venue recognition compared to conventional approaches (e.g., state-of-the-art convolutional neural network features).

More specifically, in one aspect, a computing device (e.g., a local computing device, such as a user's laptop, mobile phone, and the like or a remote computing device such as a server) receives a first image that is associated with a particular geographic area (e.g., rough GPS coordinates can be extracted from metadata associated with the image). The computing device also retrieves a first set of textual reviews (e.g., online reviews, such as those available through services such as Yelp) and a second set of stored images (e.g., user-submitted images of business venues, such as those available through services such as Instagram) that are associated with one or more candidate business venues (e.g., each candidate is located within a predetermined distance of the particular geographic area). The computing device also detects, using trained visual detectors, a plurality of business-aware concepts in the first image and assigns a score that reflects likelihood that the detected business-aware concept is present in the first image. The computing device additionally: (i) generates a first representation of the first image based on the scores and one or more word vectors for high-scoring business-aware concepts and (ii) generates second representations of each candidate business venue based on the first and second sets. In accordance with determining that the first representation is most similar to a respective second representation of a first candidate business venue, the method includes: (i) associating the first image with the first candidate and (ii) providing an indication of the association.

Disclosed implementations are applicable to any image that is not yet associated with a specific business venue, including those available on various social networks, stored on user's local devices, and the like.

In some implementations, methods are disclosed for identifying the specific venue and location of a non-geotagged social message, which simultaneously indicates the geographic location at a very fine-grained granularity and the venue name that is associated with the social message. In some implementations, social network information is encoded using meta-paths in a social network. Geographic information embedded in the social network is also used. A classifier is trained to compute the probability of whether a social media message and venue (an actual venue or the no-venue node) are linked.

In accordance with some implementations, a process associates images with business venues at which they were taken. The process is performed at a computing device (e.g., computing device 102, FIGS. 1 and 3 or server 200, FIGS. 1 and 2) having a display, one or more input devices, one or more processors, and memory. The process includes: receiving, via the one or more input devices, a first image that is associated with a particular geographic area. The process also includes: retrieving, from a repository that includes textual reviews and stored images associated with a plurality of business venues, a first set of textual reviews and a second set of stored images that are associated with one or more candidate business venues of the plurality of business venues (e.g., each business venue of the one or more candidate business venues is located within a predetermined distance of the particular geographic area). In some implementations, the retrieving is performed in response to receiving the first image. The process further includes: detecting, based on an analysis of the first image using trained visual detectors, a plurality of business-aware concepts in the first image (e.g., each detected business-aware concept is associated with a score that reflects likelihood that the detected business-aware concept is present in the first image). The process additionally includes: generating a first representation that corresponds to the first image based on the associated scores and based on one or more word representations for high-scoring business-aware concepts of the plurality of business-aware concepts and receiving second representations that correspond to each of the one or more candidate business venues (e.g., the second representations are based on the first set of textual reviews and the second set of stored images). In accordance with determining that the first representation is most similar to a respective second representation of a first candidate business venue, the process includes: (i) associating the first image with the first candidate business venue and (ii) providing an indication that the first image is associated with the first candidate business venue.

In this way, processes disclosed herein are able to associate the first image with the first business venue without focusing solely on comparing the first image to other images (i.e., since consumer photos are noisy and comprise many indoor images or images with general objects in human space, the image content taken at a business venue might not have unique low-level visual patterns distinguishing the first image from other images.) Therefore, rather than comparing low-level visual features in a query image (e.g., the first image) to existing database image (e.g., stored in the repository), the method represents image content in the query image and the other domains of data related to the same business venue with semantic concepts (e.g., by detecting presence of business-aware visual concepts within the first/query image). The semantic concepts can thus extend the visual content to one or more word representations.

In accordance with some implementations of the processes described above, receiving the second representations includes: detecting, based on an analysis of each stored image of the second set of stored images using the trained visual detectors, the plurality of business-aware concepts in a respective stored image. In some implementations, each detected business-aware concept is associated with a score that reflects likelihood that the detected business-aware concept is present in the respective image, and a respective second representation of a first candidate business venue is based on: (i) zero or more associated scores (e.g., each of the zero or more associated scores reflects likelihood that a respective business-aware concept is present in images that are associated with the first candidate business venue) and (ii) one or more word representations for respective textual reviews that are associated with the first candidate business venue. In some implementations, likelihood that a respective business-aware concept is present refers to a calculated probability that the respective business-aware concept is present. In other implementations, likelihood refers to a reasonable chance (e.g., greater than a 50% chance) that the respective business-aware concept is present without calculating a definite probability.

In accordance with some implementations of the processes described above, each concept of the plurality of business-aware concepts satisfies the following conditions: (i) the respective concept is business aware; (ii) the respective concept is visually consistent; and (iii) the respective concept is discriminative for business venue recognition. In this way, only concepts that capable of being recognized in images and discriminating between various business venues are selected for inclusion in the repository (e.g., all other potential concepts are filtered out). In some implementations, each business-aware concept is cross-validated to ensure that the conditions are met, e.g., using a training set of images to ensure conditions are met. In some implementations, frequent nouns are identified in text associated with the business venues (e.g., reviews), and concepts are then identified if they satisfy all of the conditions (e.g., eliminate low accuracy concepts that are not visually detectable) and eliminate high entropy concepts that are non-discriminative).

In accordance with some implementations of the processes described above, the plurality of business-aware concepts are identified by mining text associated with business venues to identify the business-aware concepts (e.g., the text includes reviews about the business venues, company profiles, purchase logs, and the like).

In accordance with some implementations of the processes described above, the trained visual detectors are trained by using images that are relevant to the plurality of business-aware concepts and constructing visual concept detectors that are configured to match visual concepts in a query image with one or more of the business-aware concepts.

In accordance with some implementations of the processes described above, the trained visual detectors are trained before receiving the first image.

In accordance with some implementations of the processes described above, before associating the first image with the first candidate business venue, the repository included no images that were associated with the first candidate business venue. In some implementations, before associating the first image with the first candidate business venue, some (e.g., more than one) of the one or more candidate business venues may have no associated images in the repository. In other words, the process is able to match an image to a business venue based on word representations alone (e.g., identify visual concepts in the first image and match those visual concepts to word representations for the first business venue based only on textual reviews associated with the first business venue, even though no images were currently available for the first business venue).

In accordance with some implementations of the processes described above, the provided indication includes a visual indication with a textual description indicating that the first image was taken at the first business venue.

In accordance with some implementations of the processes described above, determining that the first representation is most similar to a respective second representation of a first candidate business venue includes determining that the respective second representation is closest to the first representation in a multi-dimensional space of the plurality of business-aware concepts.

In accordance with some implementations of the processes described above, before receiving the first image, the plurality of business-aware concepts are identified by analyzing images and textual reviews associated with business venues to locate those concepts that satisfy the following conditions: (i) the respective concept is business aware; (ii) the respective concept is visually consistent; and (iii) the respective concept is discriminative for business venue recognition.

In accordance with some implementations of the processes described above, associating the first image with the first business venue includes sending the first image for storage in the repository.

In accordance with some implementations of the processes described above, the received first image corresponds to an image taken in an indoor environment.

In accordance with some implementations of the processes described above, the received first image corresponds to an image taken in an outdoor environment.

In accordance with some implementations of the processes described above, the particular geographic area is associated with rough coordinates (e.g., GPS coordinates associated with the first image or GPS coordinates associated with the computing device at a point in time when the first image was taken) at which the first image was taken.

In accordance with some implementations of the processes described above, the particular geographic area is determined based on Wi-Fi signals detected by the computing device when the first image was taken. In some implementations, a user's history log of activity within a particular social network is utilized to determine the particular geographic area (e.g., based on previous check-in locations or other location data associated with previous posts from the user) or to further narrow down the candidate business venues that are included in the one or more candidate business venues (see, e.g., techniques described in the descriptions for the related applications noted above).

In accordance with some implementations of the processes described above, the first representation is a multimodal representation of the first image. A multimodal representation is a representation that combines representations of multiple modalities (e.g., images and text). In some implementations, the multimodal representation is a combination of (i) each detected business-aware concept and the associated score reflecting likelihood that the detected business-aware concept is present in the first image (e.g., a first vector representing the detected business-aware concepts and associated scores) and (ii) the one or more word representations for the high-scoring business-aware concepts (e.g., a second vector representing the one or more word representations).

In accordance with some implementations of the processes described above, the high-scoring business-aware concepts are associated with an assigned score that is above a score threshold.

In accordance with some implementations of the processes described above, the repository of textual reviews and stored images associated with the plurality of business venues is maintained at a server system that is remotely located from the computing device.

Some implementations apply the same techniques described herein to numerous diverse contexts. More generally, the disclosed techniques can be applied to estimate whether an image was taken at a specific of interest (POI). For example, creating a social network graph of photos, users, and points of interest, the techniques can estimate whether a given photo (that is not geotagged) was generated at a point of interest. As additional examples, the implementations disclosed herein can be used for: (i) check-in location recommendations (e.g., when a user posts an image to a social media service, the implementations disclosed herein can be used to recommend a business venue associated with the image); (ii) location profiling (e.g., understanding user activities and experiences at specific business venues based of determined associations between images and the specific business venue); and (iii) location-based services (e.g., targeting promotional information or advertisements for users based on determined associations between business venues and images).

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Like reference numerals refer to corresponding parts throughout the drawings.

DESCRIPTION OF IMPLEMENTATIONS

Reference will now be made in detail to various implementations, examples of which are illustrated in the accompanying drawings. In the following detailed description, numerous specific details are set forth in order to provide a thorough understanding of the invention and the described implementations. However, the invention may be practiced without these specific details. In other instances, well-known methods, procedures, components, and circuits have not been described in detail so as not to unnecessarily obscure aspects of the implementations.

Figure 1:
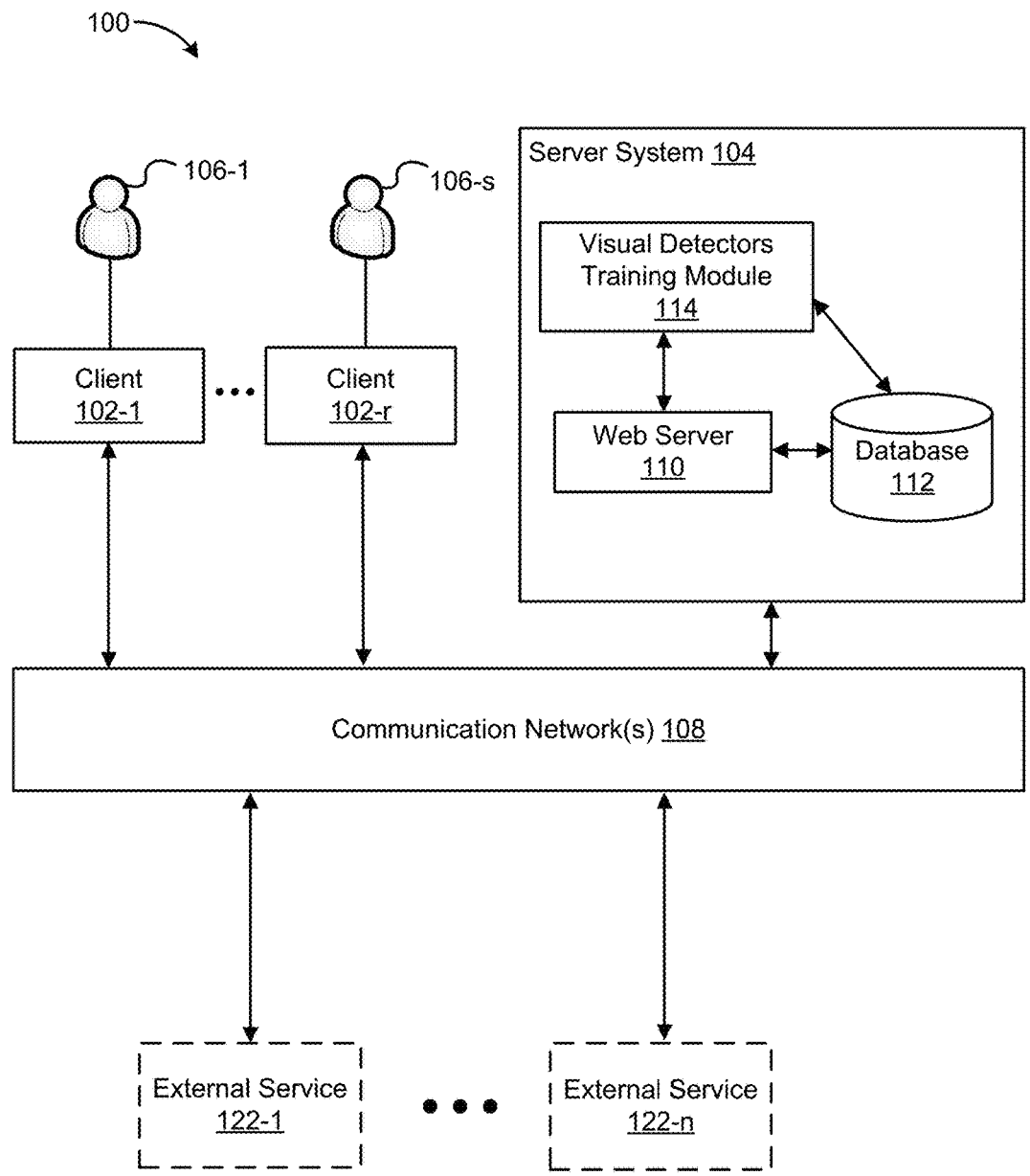
FIG. 1 is a block diagram illustrating a business venue association system for query images (e.g., images that are not yet associated with business venues at which they were taken) in accordance with some implementations.

FIG. 1 is a block diagram of a distributed system 100 including a visual detectors training module 114, which is part of a server system 104, according to some implementations. The distributed environment 100 includes one or more clients 102 (e.g., clients 102-1, . . . , 102-s), each operated by a respective user 106 (e.g., users 106-1, . . . , 106-s). There is not necessarily a one-to-one correspondence between the client devices 102 and the users 106. The server system 104 is interconnected with the clients 102 by one or more communication network(s) 108, such as the Internet.

A client 102 (sometimes called a "client device" or a "client computer" or a "computing device") may be any computer or similar device through which a user 106 of the client 102 can submit requests to and receive results or services from the server system 104. Examples of client devices include desktop computers, notebook computers, tablet computers, mobile phones, personal digital assistants, set-top boxes, or any combination of the above. A client 102 typically runs client applications 326, which can submit requests to the server system 104. For example, some clients include a web browser 324 or other type of application that permits a user 106 to search for, browse, and/or use resources (e.g., webpages and web services) accessed from the server system 104 over the communication network 108.

In some instances, a client device 102 is a mobile device, such as a laptop computer or a smart phone. Users 106 commonly use mobile devices 102 to execute messaging and social media applications that interact with external services 122, such as Twitter, Foursquare, Yelp, Instagram, and Facebook. The server system 104 connects to the external services 122 to obtain textual reviews and stored images to use for discovering business-aware concepts and training visual detectors to identify those business-aware concepts in images.

In some implementations, a client device 102 includes a local classification component (e.g., an application 326), which works in conjunction with the visual detectors training module 114 at the server system 104 as components of a classification system. In some implementations, the classification components are software applications for organizing and retrieving data from large-scale social media image databases stored at the external services 122 or at the server system 104. In some implementations, the local classification component executes at a client 102, but in other implementations, the local classification component is part of the classification module 114 at the server system 104. In some implementations, the local classification component and the classification module 114 are implemented on separate servers in the server system 104.

The communication network 108 can be any wired or wireless local area network (LAN) and/or wide area network (WAN), such as an intranet, an extranet, the Internet, or a combination of such networks. In some implementations, the communication network 108 uses the HyperText Transport Protocol (HTTP) to transport information using the Transmission Control Protocol/Internet Protocol (TCP/IP). HTTP permits client computers to access various resources available via the communication network 108. The term "resource" as used throughout this specification refers to any piece of information and/or service that is accessible via a content location identifier (e.g., a URL) and can be, for example, a webpage, a document, a database, an image, a computational object, a search engine, or other online information service.

In some implementations, the server system 104 distributes content (e.g., information about business venues (textual reviews and stored images), social media messages, web pages, images, digital photos, documents, files, and advertisements). In some implementations, the server system 104 includes many files or other data structures of various types, and those files or data structures include combinations of text, graphics, video, audio, digital photos, and other digital media files.

In some implementations, the server system 104 includes a visual detectors training module 114. The visual detectors training module 114 is a machine learning application that utilizes a large collection of existing data about business venues. In some implementations, the large collection of existing data includes visual images, textual reviews stored by services such as Yelp, venues stored by services such as Foursquare, to automate a training process for visual detectors that are then used to identify business-aware concepts in images.

In some implementations, the server system 104 connects to the external services 122 and obtains information such as textual reviews and stored images gathered by the external services 122. The information obtained is then stored in the database 112 on the server 104. In some implementations, the database 112 stores textual reviews 228 and stored images 230. This data is used to discover business-aware concepts, to train visual detectors to detect the discovered business-aware concepts in images, and to produce representations (e.g., vector-based representations) of existing business venues and un-associated images. In some implementations, during discovery of business-aware concepts, business-aware concepts 232 are stored in the database. In some implementations, the database 112 stores other data as well (such as visual detectors 224 and generated representations of query images and business venues 238).

Figure 2:
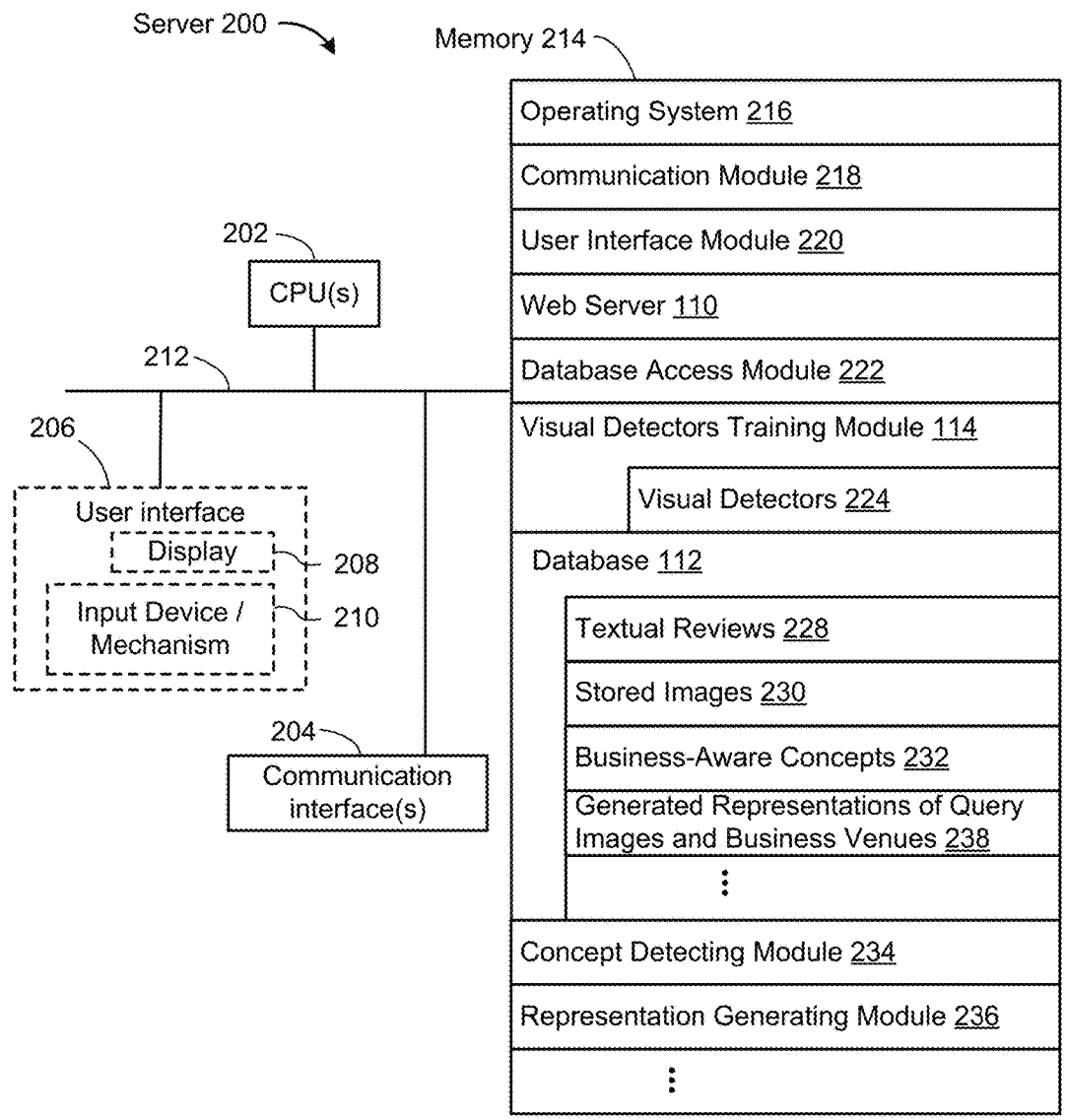
FIG. 2 is a block diagram illustrating a server in accordance with some implementations.

FIG. 2 is a block diagram illustrating a server 200 that may be used in a server system 104. A typical server system includes many individual servers 200, which may be co-located or located in multiple distinct physical locations. A server 200 typically includes one or more processing units (CPUs) 202 for executing modules, programs, or instructions stored in the memory 214 and thereby performing processing operations; one or more network or other communications interfaces 204; memory 214; and one or more communication buses 212 for interconnecting these components. The communication buses 212 may include circuitry (sometimes called a chipset) that interconnects and controls communications between system components. In some implementations, a server 200 includes a user interface 206, which may include a display device 208 and one or more input devices 210, such as a keyboard and a mouse.

In some implementations, the memory 214 includes high-speed random access memory, such as DRAM, SRAM, DDR RAM or other random access solid state memory devices. In some implementations, the memory 214 includes non-volatile memory, such as one or more magnetic disk storage devices, optical disk storage devices, flash memory devices, or other non-volatile solid state storage devices. In some implementations, the memory 214 includes one or more storage devices remotely located from the CPU(s) 202. The memory 214, or alternately the non-volatile memory device(s) within memory 214, comprises a non-transitory computer readable storage medium. In some implementations, the memory 214, or the computer readable storage medium of memory 214, stores the following programs, modules, and data structures, or a subset thereof:

- an operating system 216, which includes procedures for handling various basic system services and for performing hardware dependent tasks;
- a communication module 218, which is used for connecting the server 200 to other computers via the one or more communication network interfaces 204 (wired or wireless) and communication networks 108, such as the Internet, other wide area networks, local area networks, metropolitan area networks, and so on;
- a user interface module 220, which receives input from one or more input devices 210, and generates user interface elements for display on a display device 208;
- one or more web servers 110, which receive requests from client devices 102, and return responsive web pages, resources, or links. In some implementations, each request is logged in the database 112;
- a database access module 222, which includes procedures for reading, writing, and querying data stored in the database 112;
- a visual detectors training module 114, which is used to train one or more visual detectors 224 to detect business-aware concepts in images, as described below with respect to FIGS. 4A-4C, 5, and 6;
- one or more databases 112, which store data used by the visual detectors training module 114 and/or the visual detectors 224. In some implementations, the databases 112 are relational databases, such as SQL databases while, in other implementations, the databases 112 include a collection of data structures, such as JSON objects, or combinations of relational databases and data structures that are stored in non-relational forms. In some implementations, the databases 112 store:
  - textual reviews 228 about a variety of business venues that are collected from a variety of external services (e.g., externals services 122-1, FIG. 1, such as Yelp, Foursquare, and the like), as well as other information used to discover business-aware concepts and train visual detectors;
  - stored images 230 associated with a variety of business venues that are collected from a variety of external services (e.g., externals services 122-1, FIG. 1, such as Instagram, Facebook, and the like), as well as other information used to discover business-aware concepts and train visual detectors;
  - business-aware concepts 232 that are discovered based on an analysis of textual reviews 228 and/or stored images 230 (in some implementations, the stored images 230 are used to validate that each discovered business-aware concept 232 conforms to predefined requirements for business-aware concepts, in order to ensure that the business-aware concepts 232 are business-aware, visually detectable, and discriminative terms that can be used for business venue recognition purposes (i.e., each respective business-aware concept 232 is capable of training at least visual detector that will be able to reliably detect the respective business-aware concept in images); and
  - generated representations of query images and business venues 238, which are used to locate a most similar business venue for a respective query image, as described in more detail below in reference to FIGS. 4A-4C, 5, and 6;
- concept detecting module 234 for using the visual detectors 224 to identify business-aware concepts in images (e.g., in query images that are not yet associated with business venues and/or in stored images 230 that are already associated with business venues), in some implementations the concept detecting module 234 receives an image and then produces a vector of scores for each business-aware concept (e.g., of the business-aware concepts 232) that identifies likelihood that the respective business-aware concept is present in an image; and
- representation generating module 236 for producing/creating/generating the generated representations of query images and business venues 238 (e.g., including vectors of scores for business-aware concepts and word representations).

Each of the above-identified elements in FIG. 2 may be stored in one or more of the previously mentioned memory devices. Each executable program, module, or procedure corresponds to a set of instructions for performing a function described above. The above-identified modules or programs (i.e., sets of instructions) need not be implemented as separate software programs, procedures or modules, and thus various subsets of these modules may be combined or otherwise re-arranged in various implementations. In some implementations, the memory 214 stores a subset of the modules and data structures identified above. Furthermore, the memory 214 may store additional modules or data structures not described above.

Although FIG. 2 illustrates a server 200, FIG. 2 is intended more as functional illustration of the various features that may be present in servers that are used in a server system 104 rather than as a structural schematic of the implementations described herein. In practice, and as recognized by those of ordinary skill in the art, items shown separately could be combined and some items could be separated. The actual number of servers 200 used to implement these features in a server system 104, and how features are allocated among them, will vary from one implementation to another, and may depend in part on the amount of data traffic that the system must handle during peak usage periods as well as during average usage periods.

Figure 3:
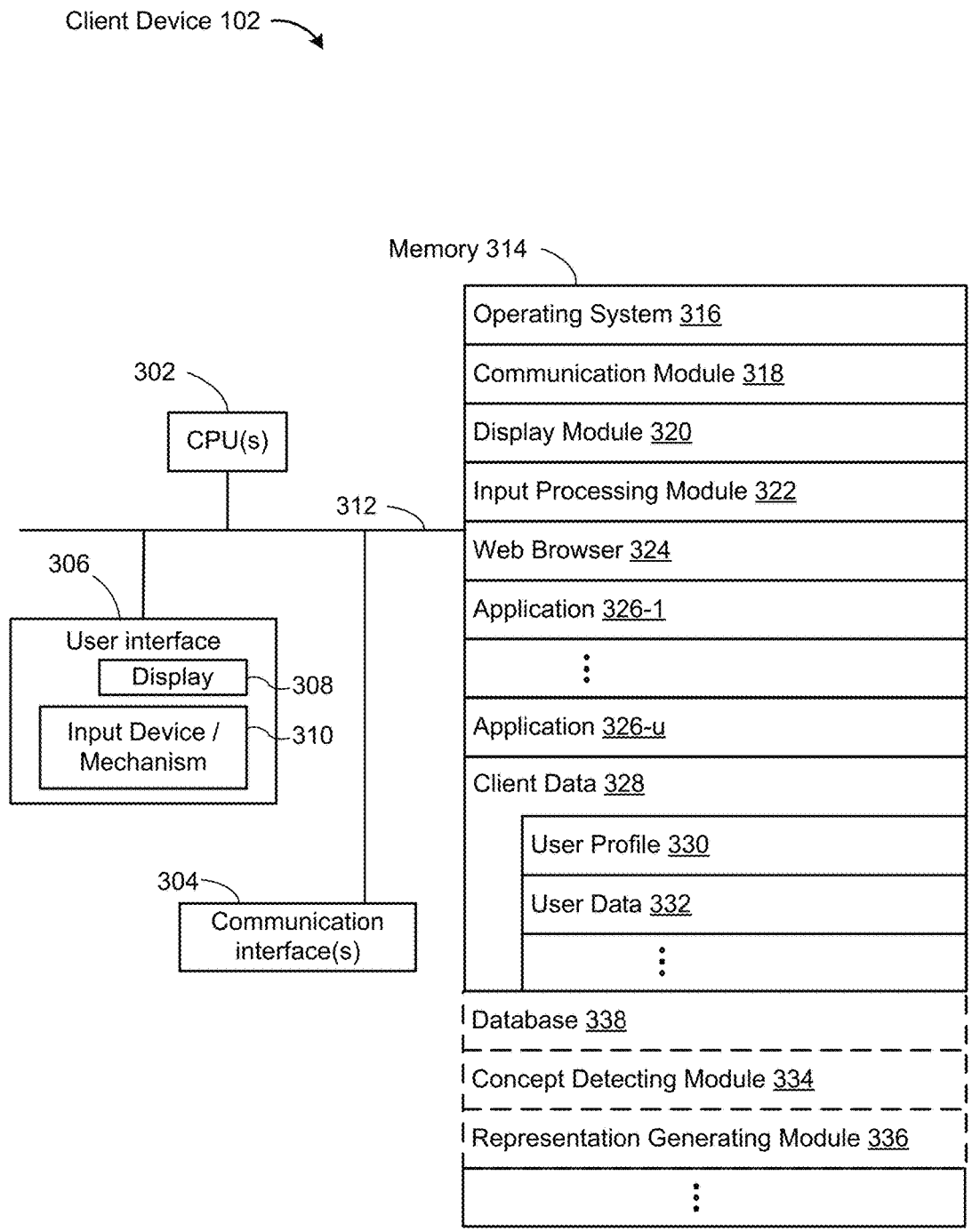
FIG. 3 is a block diagram illustrating a client device in accordance with some implementations.

FIG. 3 is a block diagram illustrating a client device 102 in accordance with some implementations. Client devices 102 include laptop computers, notebook computers, tablet computers, desktops computers, smart phones, PDAs, consumer cameras, first-person cameras, smart watches, etc. In some implementations the client devices 102 include at least one server (e.g., associated with a social media service) that processes images and associates them with business venues, in order to provide improved social media interactions (e.g., better business venue recommendations that are targeted based on business venues previously visited by a particular user). A client device 102 typically includes one or more processing units (CPUs) 302, one or more network interfaces 304, memory 314, a user interface 306, and one or more communication buses 312 (sometimes called a chipset) for interconnecting these components. The user interface 306 includes one or more output devices 308 that enable presentation of media content, including one or more speakers and/or one or more visual displays. The user interface 306 also includes one or more input devices 310, including user interface components that facilitate user input such as a keyboard, a mouse, a voice-command input unit or microphone, a touch screen display, a touch-sensitive input pad, a camera (e.g., for taking photos at various business venues, although location information may not be stored along with the photos), a gesture capturing camera, or other input buttons or controls. Furthermore, some client devices 102 use a microphone and voice recognition or a camera and gesture recognition to supplement or replace the keyboard.

The memory 314 includes high-speed random access memory, such as DRAM, SRAM, DDR RAM, or other random access solid state memory devices. In some implementations, the memory includes non-volatile memory, such as one or more magnetic disk storage devices, one or more optical disk storage devices, one or more flash memory devices, or one or more other non-volatile solid state storage devices. In some implementations, the memory 314 includes one or more storage devices remotely located from the processing units 302. The memory 314, or alternatively the non-volatile memory within memory 314, comprises a non-transitory computer readable storage medium. In some implementations, the memory 314, or the non-transitory computer readable storage medium of memory 314, stores the following programs, modules, and data structures, or a subset or superset thereof:

- an operating system 316, which includes procedures for handling various basic system services and for performing hardware dependent tasks;
- a communication module 318, which is used for connecting a client device 102 to other computers and devices via the one or more communication network interfaces 304 (wired or wireless) and one or more communication networks 108, such as the Internet, other wide area networks, local area networks, metropolitan area networks, and so on;
- a display module 320, which receives input from the one or more input devices 310, and generates user interface elements for display on the display device 308;
- an input processing module 322 for detecting one or more user inputs or interactions from one of the one or more input devices 310 and interpreting the detected input or interaction;
- a web browser 324, which enables a user to communicate over a network 108 (such as the Internet) with remote computers or devices;
- one or more applications 326-1-326-$u$, which are configured for execution by client device 102. In various implementations, the applications 326 include a camera module, a sensor module, one or more games, application marketplaces, payment platforms, and/or social network platforms. In some implementations, one or more of the applications 326 run within the web browser 324. In some implementations, the one or more applications include an application that allows a user of the device 102 to submit images for processing and identification of an associated business venue (e.g., using any of the methods described below, such as those described in reference to FIGS. 4A-4C, 5 and 6);
- client data 328, which includes information about the device 102 or users 106 of the device 102. In some implementations, the client data 328 includes one or more user profiles 330, which may include user-specific information about business venues visited by a user of the device 102 that can be used to help identify business venues that are associated with query images (e.g., to help refine/filter lists of candidate business venues). In some implementations, the client data 328 includes user data, which logs user activity on the client device;
- optionally including a concept detecting module 234 for using the visual detectors 224 (e.g., after receiving, from a server 200, one or more visual detectors 224, the client device is then able to execute the detection process locally) to identify business-aware concepts in images (e.g., in query images that are not yet associated with business venues and/or in stored images 230 that are already associated with business venues), in some implementations the concept detecting module 234 receives an image (e.g., from a user of the device) and then produces a vector of scores for each business-aware concept (e.g., of the business-aware concepts 232) that identifies likelihood that the respective business-aware concept is present in an image; and
- optionally including a representation generating module 236 for producing/creating/generating the generated representations of query images and business venues 238 (e.g., including vectors of scores for business-aware concepts and word representations); and
- optionally including one or more databases 338 for storing all or a portion of the data stored in databases 112 (FIG. 2) when, e.g., network traffic conditions are slow and thus data can be more efficiently stored and accessed locally than by exchanging information with one or more servers 200 over a network.

Each of the above-identified executable modules, applications, or sets of procedures may be stored in one or more of the previously mentioned memory devices and corresponds to a set of instructions for performing a function described above. The above-identified modules or programs (i.e., sets of instructions) need not be implemented as separate software programs, procedures, or modules, and thus various subsets of these modules may be combined or otherwise re-arranged in various implementations. In some implementations, the memory 314 may store a subset of the modules and data structures identified above. Furthermore, the memory 314 may store additional modules or data structures not described above.

Although FIG. 3 shows a client device 102, FIG. 3 is intended more as a functional description of the various features that may be present rather than as a structural schematic of the implementations described herein. In practice, and as recognized by those of ordinary skill in the art, items shown separately could be combined and some items could be separated.

In some implementations, some of the functions of the server system 104 are performed by a client device 102, and the corresponding sub-modules of these functions may be located within the client device 102 rather than the server system 104. Conversely, in some implementations, some of the functions of a client device 102 are performed by server system 104, and the corresponding sub-modules of these functions may be located within the server system 104 rather than a client device 102 (e.g., some of the business-aware concept discovery operations and some of the visual concept detection and training operations can be shared between the client and server devices). The server 200 and client device 102 shown in FIGS. 2 and 3 illustrate some implementations. Other configurations may be used to implement the functions described herein.

Figure 4A:
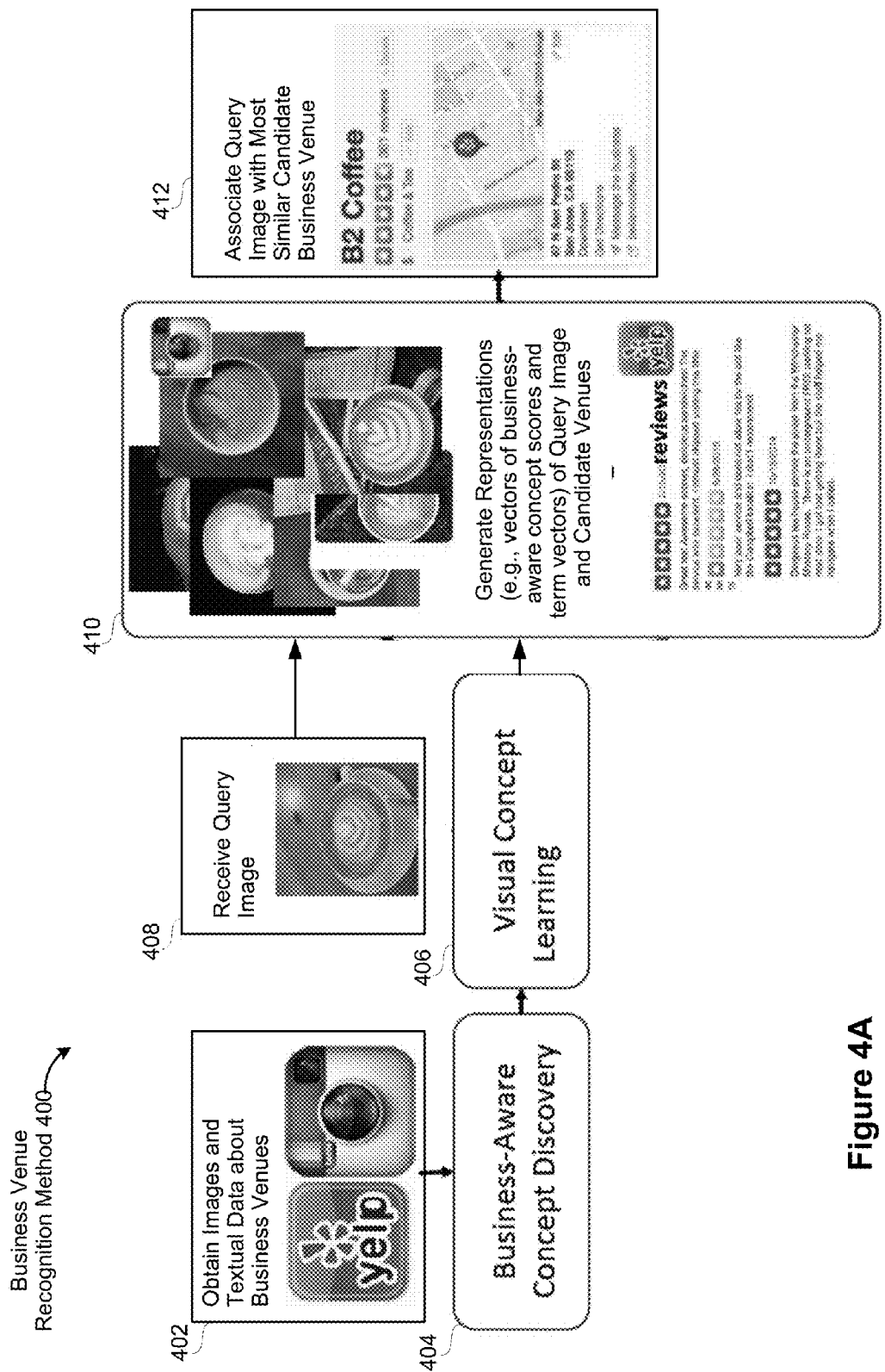
FIGS. 4A-4C are a flowchart illustrating methods of discovering business-aware concepts, training visual detectors, and associating query images with business venues using the trained visual detectors and word representation models, in accordance with some implementations.
Figure 4B:
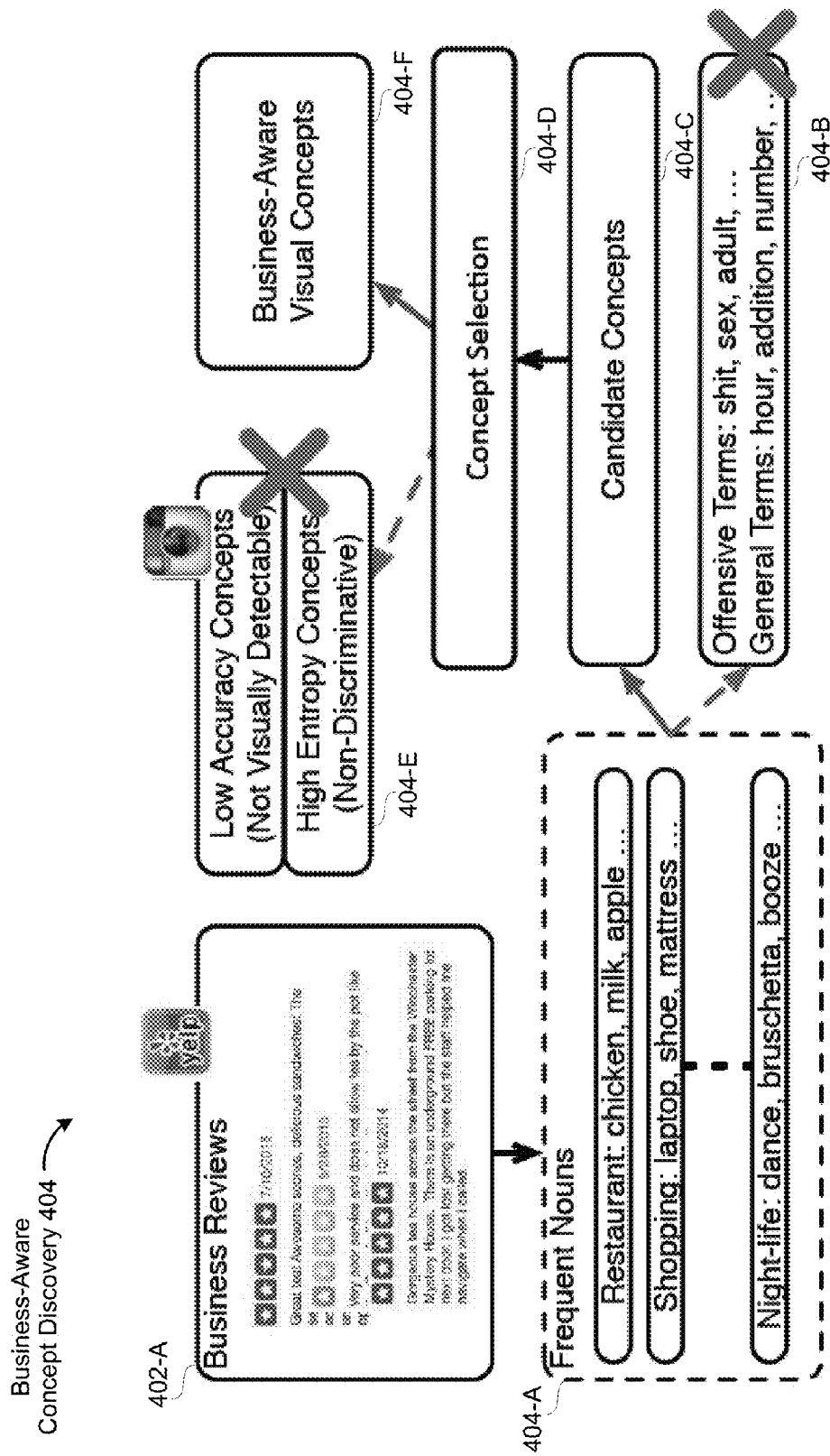
Figure 4C:
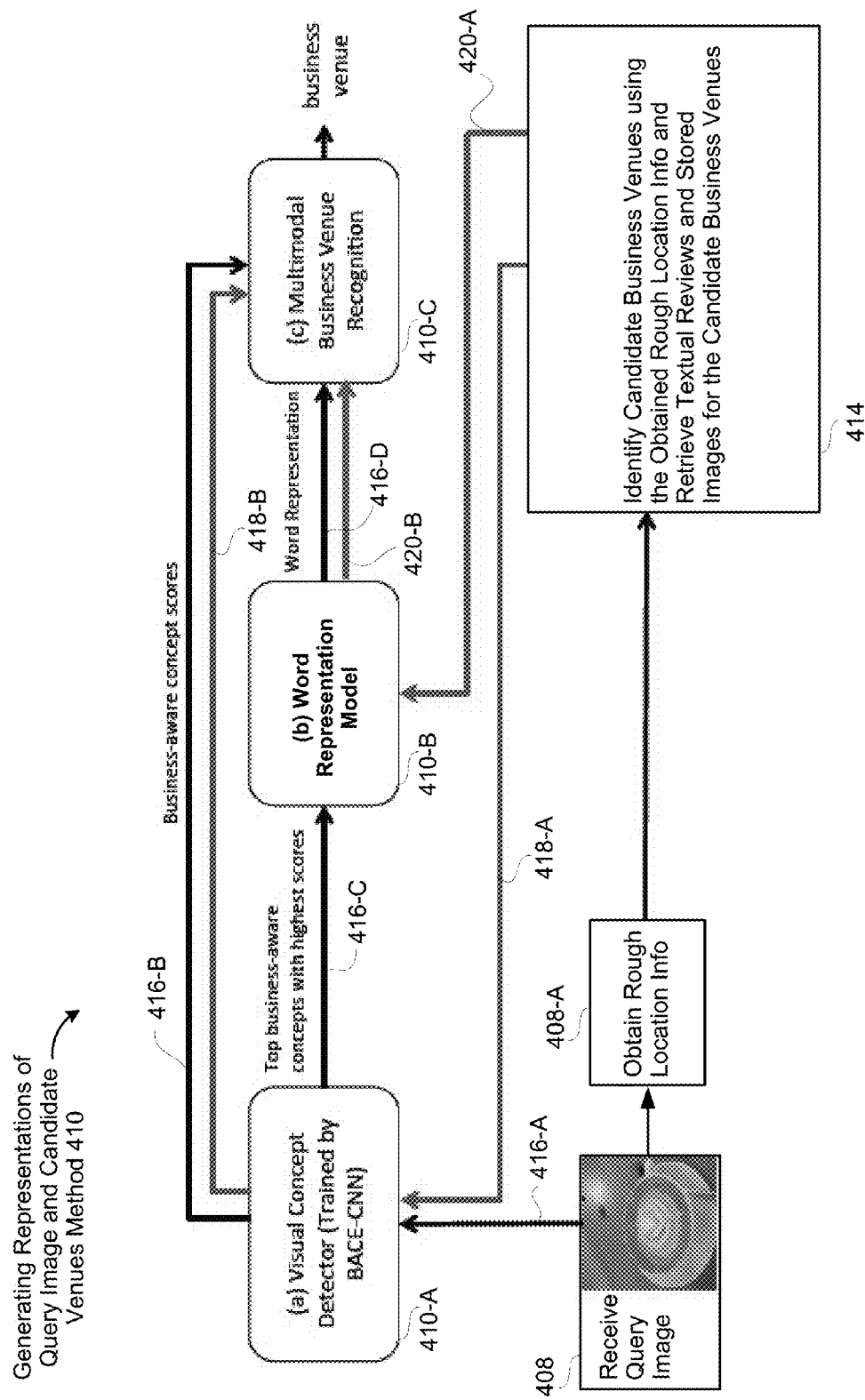

FIGS. 4A-4C are a flowchart depicting methods of discovering business-aware concepts, training visual detectors, and associating query images with business venues using the trained visual detectors, in accordance with some implementations. In some implementations, the method 400 (and associated methods 404 and 410) is performed by a computing device (e.g., computing device 102, FIG. 1) and/or one or more components of the computing device (e.g., operating system 126, etc.). In some implementations, the method 400 is performed by the computing device in combination with one or more servers 200 (FIG. 2), e.g., the one or more servers 200 send data to the computing device 102 that is used by the computing device to execute the operations of method 400 (e.g., some operations of method 400 are performed by the one or more servers 200). In some implementations, the method 400 is governed by instructions that are stored in a non-transitory computer-readable storage medium and that are executed by one or more processors of a device, such as the one or more processors 302 of device 102 (FIG. 3). For ease of explanation, the following describes method 400 as performed by the device 102. In some implementations, with reference to FIG. 3, the operations of method 400 are performed by or use, at least in part, a database 338, concept detecting module 334, representation generating module 336, and the device 102 also receives data from one or more servers 200 (e.g., textual reviews 228, stored images 230, business-aware concepts 232, and generated representations of query images and business venues 238, FIG. 2) that is used to perform one or more of operations of method 400, input devices 310, and/or display 308 (e.g., a touch-sensitive display). Some operations in method 400 are, optionally, combined and/or the order of some operations is, optionally, changed.

As shown in FIG. 4A, an example business venue recognition method 400 begins by obtaining (402) images and textual data (e.g., reviews, company profiles, and the like) about business venues. In some implementations, the obtained textual data is gathered from data sources such as Yelp and other online services that allow users to post reviews about business venues. In some implementations, the images are obtained from online services such as Instagram, Yelp, and other similar services that allow users to post images that are associated with specific business venues. The method then uses the obtained textual and image data to discover (404) business-aware concepts that can be used to train (406) visual detectors to detect the business-aware concepts in images. Additional details regarding discovering business-aware concepts are provided below in reference to FIGS. 4B and 5.

The method also includes receiving (408) a query image and analyzing the query image (at operation 410 and using the trained visual detectors from operation 406) to detect the discovered business-aware concepts in the query image. Example business-aware concepts that might be detected from the sample query image shown in 408 include "espresso," "coffee," and "table." In some implementations, a business-aware convolutional neural network ("BA-CNN") is used to train the visual detectors for detection of the business-aware concepts in the content of the query image and the detected business-aware concepts are each assigned a score that reflects likelihood that the detected business-aware concept is present in the image content (i.e., the detection operation outputs a first vector of scores and associated business-aware concepts). Stated another way, the BA-CNN incorporates semantic signals mined from business reviews for training visual detectors and extracting business-aware features. Then, one or more of the detected concepts are further represented by a term vector (e.g., a second vector that is associated with the query image). In some implementations, term vectors are constructed using known word representation models (e.g., such as Word2Vec, as described in Tomas Mikolov, Kai Chen, Greg Corrado, and Jeffrey Dean, Efficient Estimation of Word Representations in Vector Space, In Proceedings of Workshop at ICLR, 2013, which is herein incorporated by reference in its entirety). The first vector and the second vector then represent (410) the query image to match against representations of business venues in a database (e.g., to find a business venue representation that is closest to the representation of the query image). In some implementations, the first and second vectors form a multimodal representation of the first image.

Additionally, and as described below in reference to FIGS. 4C and 5, stored images and textual data for business venues are also analyzed using operations 406 and 410 in order to generate representations (e.g., term vectors and visual concept scores for textual data and images) for the business venues (e.g., candidate venues that are selected as described below in reference to FIGS. 4C and 5). For example, visual concepts and one or more word representations (i.e., term vectors) for each image are pre-computed as described above (in operation 410). The textual data is also represented by term vectors. The visual concepts and word representations of the query image are then matched against those extracted from the textual data and stored images. The business venue associated with the best-matched images and textual reviews is returned as the most likely business venue (412).

In some implementations, the process for locating best-matched images and textual reviews across the two modalities (e.g., image and text) of representations is performed using one of: (1) a concatenated representation across modalities (also referred to as "early fusion") and (2) comparing each single representation to others of a same modality and then matching scores are averaged (also referred to as "late fusion").

(1) In some implementations, matching by early fusion includes: concatenating the first vector (i.e., the scores and associated business-aware concepts for the query image) and the second vector (i.e., the term vectors for the query image) as a single vector representation for the query image that is then used to match concatenated vector representations of the stored images and textual reviews of business venues in the database. The likelihood of a query image being associated with (i.e., belonging to) a business venue is based on similarity of the single vector representation for the query image as compared to a respective concatenated vector representation for a respective business venue.

(2) In some implementations, matching by late fusion includes: matching across a single modality and without the use of concatenation. For example, the first vector is compared with (or matched against) each stored image in the database and the second vector is compared with (or matched against) each textual review in the database. The similarity scores across each single modality are then fused (e.g., averaged) to obtain an overall likelihood that a query image belongs to (or is associated with) a business venue. In some implementations, computation of similarity measurement for either or both of (1) and (2) above could be via various methodologies, e.g., Euclidean distance, distance metric learning, learning to rank, and the like.

Turning now to FIG. 4B, an example method of discovering business-aware concepts 404 (in addition to those provided in reference to FIG. 4A) is illustrated. As discussed above, operation 402 of method 400 includes obtaining textual and image data about business venues and that textual data is identified in 402-A in order to discover business-aware concepts. In particular, business-aware concepts are (automatically and without human intervention) mined from the textual data. As discussed above, business-aware concepts are semantic concepts that satisfy a set of predefined conditions (business-awareness, visually detectable, and discriminative). In some implementations, the predefined conditions include: (1) Business Awareness: relevant to business venues (e.g., "earth" is not a good business-aware concept, because it might not be commonly used in any of the business venues and, on the other hand, "cat" might be a good business-aware concept because it could appear often in local pet shops); (2) Visually Detectable: capable of being detected in visual content in an image (e.g., "disease" although usually appears at hospitals, is hard to be detected by image content and, thus, is not a good visually detectable concept and, on the other hand, "medicine" is a good visual concept because it has more consistent visual patterns for detection); and (3) Discriminability: discriminative power to distinguish between different business venues (e.g., "person" might not have enough discriminability because it appears in general business venues, while "burger" could be a good concept as it appears more frequently in American restaurants).

In order to identify those concepts that satisfy the predefined conditions, at 404-A, frequent nouns are extracted (e.g., restaurant-specific nouns, shopping-specific nouns, night-life-related nouns, and the like), offensive/general terms are then eliminated (404-B), and a remaining set of candidate concepts is then produced (404-C). In some implementations, candidate concepts are mined from reviews of local businesses on a social media website (e.g., Yelp) to ensure satisfaction of the predefined condition for business awareness. In some implementations, business venues are classified by their top-level category in the Yelp business category topology (example categories include restaurants, active life, automotive, etc.). Then a certain number (e.g., 3000) of textual reviews are gathered from each business category respectively. From each category, a predefined number (e.g., 500) of frequent nouns are selected based on their document frequency as an initial set of candidate concepts. In some implementations, NLTK Toolkit (Bird, Klein, and Loper, Natural Language Processing with Python, 2009), which is herein incorporated by reference in its entirety, is used to tokenize words in the reviews and find part-of-speech tags. In some implementations, only nouns are selected for inclusion in the initial set of candidate concepts (such as those shown in 404-A, FIG. 4B), in order to ensure more visually detectability. In order to ensure satisfaction of the predefined condition of discriminability of each candidate concept in the initial set of candidate concepts, concepts appearing in more than ten different categories are eliminated and concepts that are identified as including offensive terms (e.g., those that are blocked by Instagram's API, such as those shown in 404-B, FIG. 4B) are also eliminated. As one example, Table 1 (shown below) provides example candidate concepts discovered in accordance with the implementations disclosed herein:

TABLE 1

| Category | # of Concepts | Example Candidate Concepts |
| --- | --- | --- |
| Restaurants | 233 | chicken, milk, apple, sashimi, onion, tea, chef, pasta, water, pizza |
| Pets | 190 | doctor, vet, furry, tail, adoption, cage, toy, cat, doggie, salon |
| Automotive | 184 | motorcycle, windshield, carpet, auto, girlfriend, stereo, wheel, gas, tank, dealership |

At 404-D, concept selection proceeds to further eliminate candidate concepts that do not satisfy the set of predefined conditions. For example, at 404-E, low accuracy concepts (e.g., those that are not visually detectable) and high entropy concepts (e.g., those that are not discriminative) are eliminated. After the elimination processes of 404-D and 404-E, a set of business-aware visual concepts remains (404-F), and each remaining business-aware visual concept is a semantic concept that satisfies the set of predefined conditions. In some implementations, discovering business-aware concepts also includes obtaining images associated with one or more of the remaining business-aware concepts and verifying that each respective remaining business-aware concept is visually detectable. In accordance with a determination that the respective remaining business-aware concept is visually detectable, the respective remaining business-aware concept is stored for future use (e.g., with business-aware concepts 232 of database 112, FIG. 2). In accordance with a determination that the respective remaining business-aware concept is not visually detectable, the respective remaining business-aware concept is not stored for future use and is instead discarded.

More specifically, after identifying the initial set of candidate concepts, each concept in the initial set of candidate concepts is utilized to retrieve a predefined number (e.g., 1,000) of images from a social media service (e.g., Instagram). Because images downloaded from social media services are noisy, a two-fold cross validation is performed (e.g., by using convolutional neural networks (CNN), such as that discussed in Krizhevsky, Sutskever, and Hinton, Imagenet classification with deep convolutional neural networks, 2012, which is herein incorporated by reference in its entirety) to select qualified images for learning accurate detectors of visual concepts. Two-fold cross validation is used to divide the images into two sets, training a separate concept classifier for each set, and finally using each to verify images in the other set.

Figure 4E:
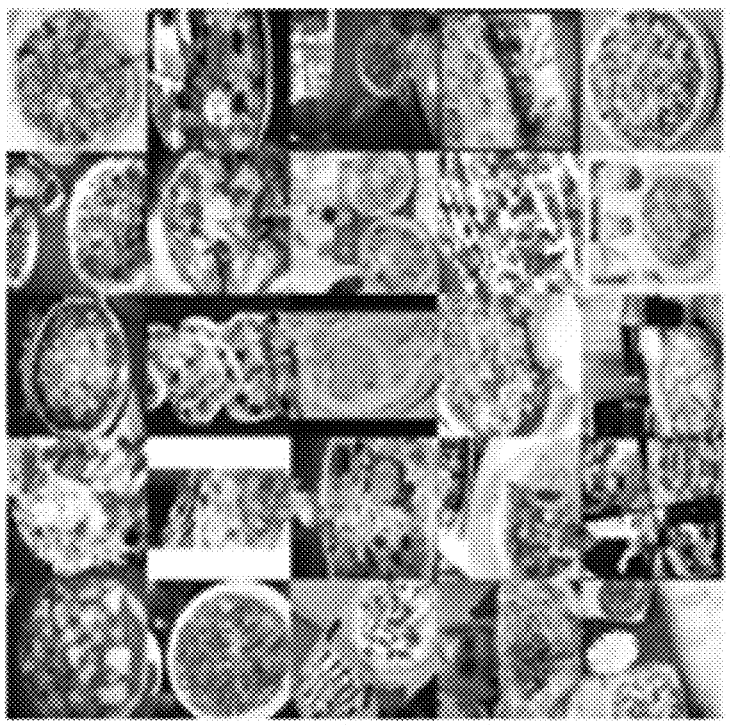
FIGS. 4D-4F show example images that are used in the process of associating images with business venues, in accordance with some implementations.
Figure 4D:
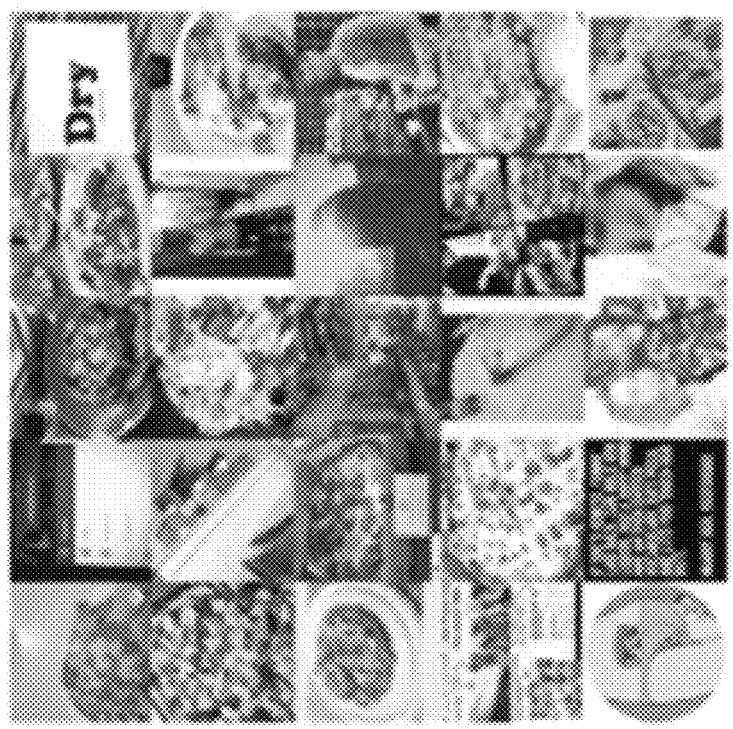

In some implementations, a top number (e.g., 250) of images from each set based on the classification score for training the concept detectors is determined. FIG. 4D shows example training data before cross-validation selection for a "pizza" concept, and FIG. 4E shows training data after cross-validation selection. As shown, the training data after selection includes images that have improved visual consistency and, therefore, the images after selection can achieve better accuracy for concept classification. In one experiment (shown in Table 2, below), cross-validation selection was shown to achieve up to 48.5% classification accuracy compared to 36.5% by simply using all images as training data. In some implementations, cross-validation selection can reach 85% accuracy.

TABLE 2

|  | Training Data | | |
| --- | --- | --- | --- |
|  | All | Random | CRV |
| Rank-1 Accuracy | 36.5% | 38.7% | 48.5% |

Figure 4F:
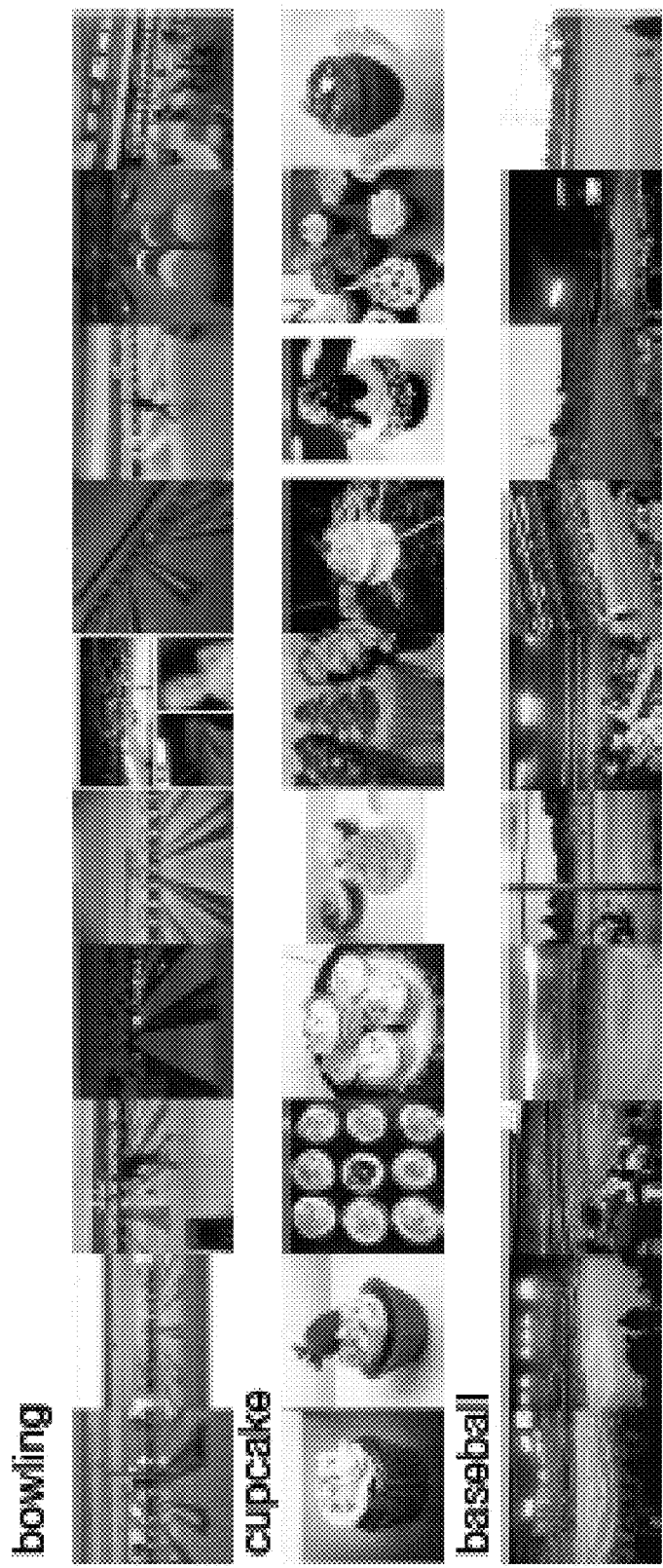

After cross-validation selection, concepts that have validation accuracy lower than 50% (using hash tag as groundtruth) are removed from the initial set of candidate concepts to ensure the visual detectability of concepts. Of the remaining concepts in the initial set of candidate concepts, those with more discriminative power are then determined by computing the cross-location normalized entropy using the following formula:

$$\eta(X^{(c)}) = -\sum_{i=1}^{n(c)} \frac{p(x_i^{(c)})\log_2(p(x_i^{(c)}))}{\log_2(n^{(c)})},$$

where X is a random variable that denotes the venue distribution of concept c. $n(X^{(c)})$ is the normalized entropy for that concept. $n^{(c)}$ is the total number of business venues that have concept c and $p(x_i(c))$ is the probability of the concept appears in a business venue i. In some implementations, datasets of images from Instagram (e.g., containing 250,000 images associated with 1,000 different business venues) are utilized and normalized entropy is computed for each concept in terms of its distribution over business venues. In some implementations, a certain number (e.g., 490) concepts with lowest entropy values are selected as business-aware visual concepts for business venue recognition. FIG. 4F shows some example concepts and corresponding images.

Turning now to FIG. 4C, a method of generating representations of query images and candidate venues 410 is shown (e.g., FIG. 4C provides additional information regarding operation 410 shown in FIG. 4A). After receiving (408) a query image, the method proceeds to extract/obtain (408-A) rough location information that is associated with the query image. For example, rough location information can be discerned based on known locations of cell towers, WiFi transmitters, GPS data associated with the image, associated posting data for the image, locations associated with known user behaviors, and the like. The method then uses that rough location information to identify (414) candidate business venues (e.g., those business venues that are located within a predefined distance of the rough location information) and retrieve textual reviews (and other relevant textual data, such as company profiles) and stored images that are associated with the candidate business venues.

In some implementations, the method 410 applies operations 410-A, 410-B, and 410-C to analyze the received query image (process flows 416-A through 416-D), the retrieved textual reviews (process flows 420-A through 420-B), and the stored images (process flows 418-A through 418-B), in order to find a candidate business venue that is associated with the received query image.

With respect to analysis of the received query image, in some implementations, the method 410 analyzes the received query image using trained visual detectors 410-A (via flow 416-A) and outputs (via flow 416-B) business-aware concept scores reflecting likelihood that a respective business-aware concept (e.g., associated with one or more of the trained visual detectors) is present in the received query image. Operation 410-A also identifies and outputs (via flow 416-C) high-scoring business-aware concepts (i.e., high likelihood that the respective business-aware concept is present in the received query image). Operation 410-B uses word representation models to output (via flow 416-D) word representations for the high-scoring business-aware concepts. In some implementations, a vector-based representation of the business-aware concept scores and the word representations are used to represent the received query image.

With respect to analysis of the retrieved textual reviews, in some implementations, the method 410 uses word representation models to generate one or more word representations for each of the retrieved textual reviews (420-A and 420-B). With respect to analysis of the stored images, in some implementations, the method 410 analyzes each respective stored image using the trained visual detectors (at operation 410-A via flow 418-A) and outputs (via flow 418-B) business-aware concept scores reflecting likelihood that the respective business-aware concept is present in the respective stored image. In some implementations, word representations and the business-aware concept scores for a respective candidate business venue produce a candidate-specific representation of the respective candidate business venue.

In some implementations, the method 410 then compares the multimodal representation of the received query image to each of the candidate-specific representations in order to find a candidate business venue that is most similar to the received query image. Stated another way, the received query image is represented as a first vector in a multi-dimensional space of the detected business-aware concepts and a distance between the representation of the received query image and other objects (textual reviews and stored images) associated with each business venue is computed to find a candidate business venue that best matches the received query image (e.g., the candidate business venue is associated with textual reviews/stored images that are closest to the representation of the received query image in the multi-dimensional space. Additional details regarding comparison and matching of representations of query images with candidate-specific representations is provided above in reference to FIG. 4A.

Figure 4G:
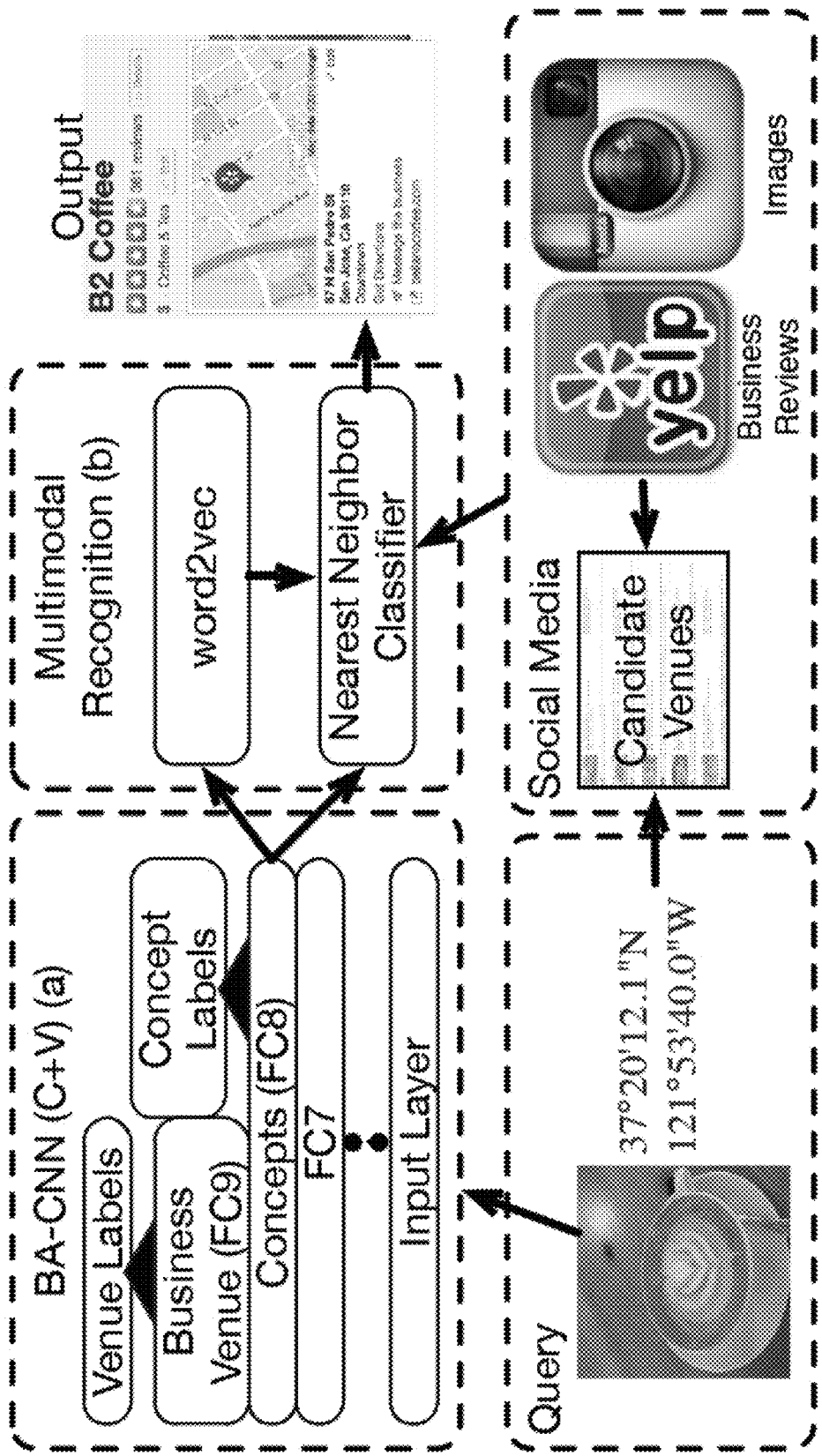
FIG. 4G is a flow diagram illustrating a method of associating a query image with a business venue using trained visual detectors and word representation models, in accordance with some implementations.

Turning now to FIG. 4G, an additional flow diagram illustrating a system framework for multimodal business venue recognition is shown, in accordance with some implementations. As shown in FIG. 4G, a query image is provided and a list of candidate venues is identified from social media using GPS (or another technique to determine rough location information, such as cell tower triangulation or WiFi signals, and the like), and business-aware concepts are detected from image content using BA-CNN. In some implementations, a word representation model is also utilized to generate word representations. The visual concept scores and word representations of the query image are then matched against those extracted from stored reviews and images in the database (e.g., database 112, FIG. 2). The business venue associated with the best-matched images and reviews is returned as the most likely business venue.

In some implementations, features supervised by different types of labels at the output layer of a CNN are utilized, and activations from the last fully-connected layer (FC7) before the output layer are used as the features to represent an image. The types of labels could be: general concepts used in ImageNet (ImageNet-CNN), business-aware concepts (BA-CNN (C)), and/or a subset of business venues (BA-CNN (V)). The comparisons of different types of labels are presented below in reference to FIGS. 6A-6C. Finally, nearest neighbor classifier is applied based on the CNN features of a query image and database images. The business venue associated with the most similar database image is output as the predicted business venue. In these implementations, however, simply using CNN features may suffer from several problems. For ImageNet-CNN (i.e., a network trained on ImageNet labels), the concepts are predefined and not relevant to local businesses; for BA-CNN (C), the discriminability only lies in separating different business-aware concepts rather than business venues; finally, with BA-CNN (V) the business venues are limited to the venues having more training images and thus cannot cover general business venues. Furthermore, CNN features generally do not have semantic meaning, which is a key property that helps to associate with other data domains (e.g., images with text).

To address these issues, in some implementations, a (BA-CNN (C+V)) is utilized to detect business-aware concepts for business venue recognition. As shown in FIG. 4G, instead of using FC7 for recognition, layer (FC8) is instead supervised by business-aware concept labels and another layer (FC9) is added on top of the concept layer supervised by a subset of business venue labels. This way, features are extracted from FC8, where each dimension corresponds to a business-aware visual concept, and the discriminative power to separate different business venues is available. BA-CNN (C+V) has a higher recognition accuracy compared to the other CNN features extracted from images. Moreover, it is able to associate multimodal data (e.g., text and images) for recognition since the features extracted by BA-CNN (C+V) are the responses of semantically describable concepts.

In some implementations, after obtaining the concept representation detected by BA-CNN, recognition accuracy for business venues can be further improved by extending image content to multimodal representations (e.g., visual concepts and textual representations). For example, reviews of local businesses (e.g. Yelp reviews) are used to train word vector models that can convert each word into a (e.g., 500-dimensional) vector representation. For each query image, a predefined number of visual concepts (e.g., 5 top scoring ones) are detected from the query image as concept words and word representations of the predefined number of visual concepts are used to represent another modality of the image. As shown in FIG. 4G (at Multimodal Recognition (b)), visual concept representation and word representations are then fused together to form a final representation of a query image. In some implementations, early fusion is utilized (i.e. concatenate the 490 dimensional concept representation and 500 dimensional word vector representation together to form a 990 dimensional vector) to combine two modalities. Similarly, the images and reviews associated to business venues in the databases are also represented as visual concepts and word representations, respectively. Finally, a nearest neighbor classifier with L2 distance based on the multimodal representation is used to determine the most likely business venue that is associated with the query image.

Figure 5:
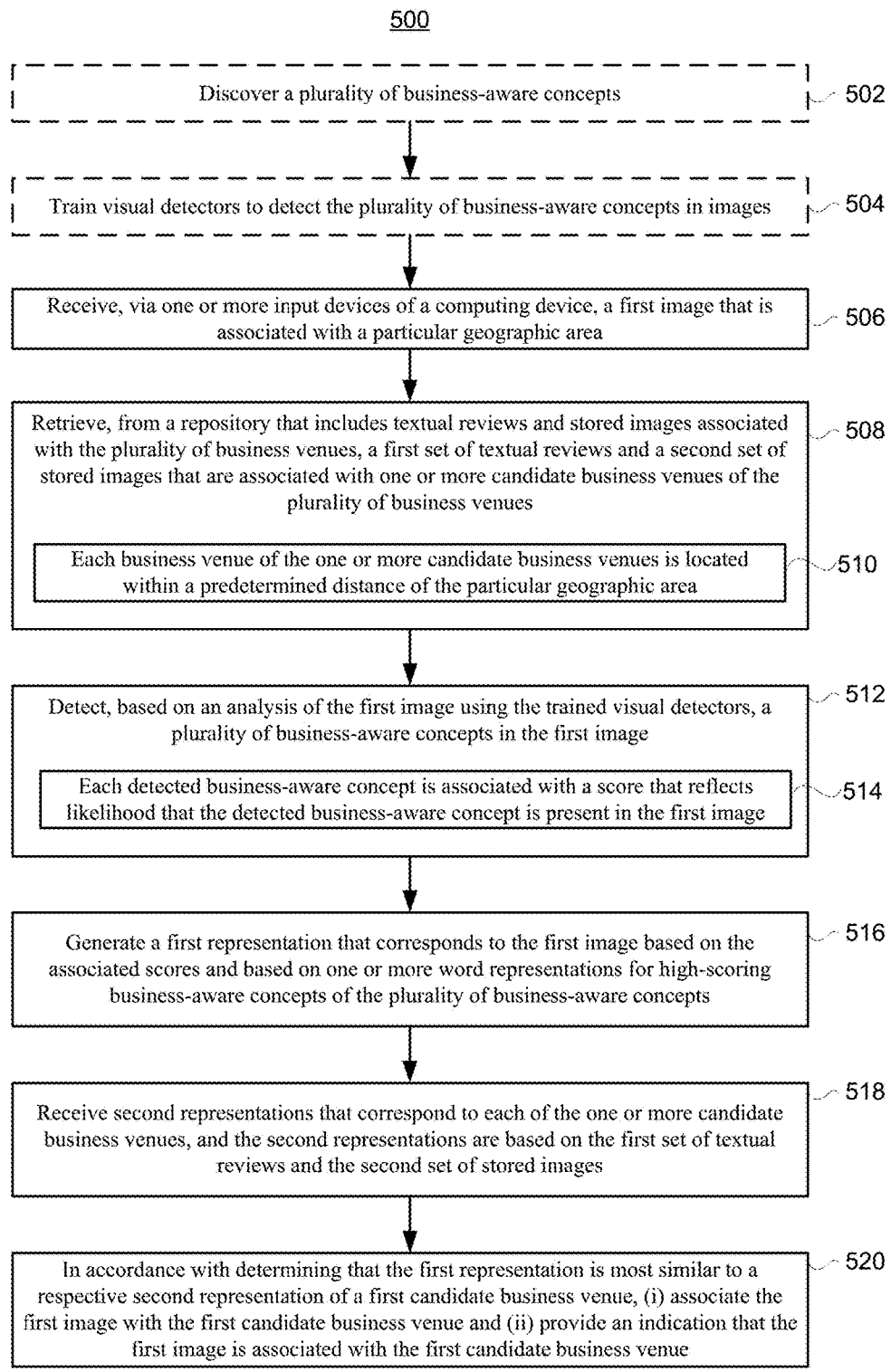
FIG. 5 is a flowchart of a process for associating an image with a business venue in accordance with some implementations.

FIG. 5 is a flowchart of a process for associating an image with a business venue in accordance with some implementations. In some implementations, the method 500 is performed by a computing device (e.g., computing device 102, FIG. 1) and/or one or more components of the computing device (e.g., operating system 126, etc.). In some implementations, the method 500 is performed by the computing device in conjunction with one or more servers 200 (FIG. 2), e.g., the one or more servers 200 send data to the computing device 102 that is used by the computing device to execute the operations of method 500 (e.g., some operations of method 500 are performed by the one or more servers 200). In some implementations, the method 500 is governed by instructions that are stored in a non-transitory computer-readable storage medium and that are executed by one or more processors of a device, such as the one or more processors 302 of device 102 (FIG. 3). For ease of explanation, the following describes method 500 as performed by the device 102. In some implementations, with reference to FIG. 3, the operations of method 500 are performed by or use, at least in part, a database 338, concept detecting module 334, representation generating module 336, and the device 102 also receives data from one or more servers 200 (e.g., textual reviews 228, stored images 230, business-aware concepts 232, and generated representations of query images and business venues 238, FIG. 2) that is used to perform one or more of operations of method 500, input devices 310, and/or display 308 (e.g., a touch-sensitive display). Some operations in method 500 are, optionally, combined and/or the order of some operations is, optionally, changed (e.g., some of the operations in method 500 are supplemented with details provided above in reference to FIGS. 4A-4G).

In some implementations, the method 500 optionally begins when the device discovers (502) a plurality of business-aware concepts. In some implementations, each concept of the plurality of discovered business-aware concepts satisfies the following predefined conditions: (i) the respective concept is business aware; (ii) the respective concept is visually consistent; and (iii) the respective concept is discriminative for business venue recognition. In this way, only concepts that capable of being recognized in images and discriminating between various business venues are selected for inclusion in the repository (in some implementations, all other potential concepts are filtered out). In some implementations, each business-aware concept is cross-validated to ensure that the conditions are met, e.g., using training set of images to ensure conditions are met (such as to ensure that each business-aware concept is visual consistent when compared to a relevant set of selected training images). In some implementations, frequent nouns are identified in text associated with the business venues (e.g., reviews), offensive terms are eliminated, and concepts are then identified if they satisfy all of the conditions (e.g., eliminate low accuracy concepts that are not visually detectable) and eliminate high entropy concepts that are non-discriminative). Additional details regarding business-aware concept discovery is discussed above in reference to FIGS. 4A-4C. In some implementations, the device optionally trains (504) visual detectors to detect the plurality of business-aware concepts in images (as described above in reference to FIGS. 4A-4C). In some implementations, the trained visual detectors (e.g., visual concept detectors) are trained by locating images that are relevant to the plurality of business-aware concepts and constructing visual concept detectors that are configured to match visual concepts in a query image with one or more of the business-aware concepts. In some implementations, business-aware concepts are detected from the image content using a convolutional neural network ("CNN"). In some implementations, a multimodal feature representation of an image is constructed that includes the visual concept detectors and each word of the predicted visual concepts is represented as a term vector. In some implementations, each textual item associated with a business venue (e.g., reviews) is also represented as a term vector. In some implementations, visual concepts and word representation of the input image are then matched against those extracted from the reviews and images in the repository, in order to match the first image to the first business venue, as discussed above in reference to FIG. 4C.

In some implementations, the device receives (506), via one or more input devices of the computing device (e.g., a camera, or an image selected by a user within a photo application, or a batch process for analyzing a large set of images for which business venues are currently unknown), a first image that is associated with a particular geographic area. For example, the first image is associated with rough location information, such as GPS coordinates, that include multiple business venues that could potentially be associated with the first image. In some implementations, the particular geographic area is determined based on WiFi signals detected or based on social network data. In some implementations, the first image was taken at a location that is within the particular geographic area and, since the particular geographic area includes multiple business venues, the exact business venue at which the image was taken remains unknown.

The computing device retrieves (508), from a repository that includes textual reviews and stored images associated with a plurality of business venues, a first set of textual reviews and a second set of stored images that are associated with one or more candidate business venues of the plurality of business venues. In some implementations, each business venue of the one or more candidate business venues is located (510) within a predetermined distance of the particular geographic area (e.g., 100 feet, 200 feet, 300 feet, etc.). In some implementations, the retrieving step (508) is performed in response to receiving the first image at 506.

The computing device then detects (512), based on an analysis of the first image using trained visual detectors, a plurality of business-aware concepts in the first image. In some implementations, each detected business-aware concept is associated (514) with a score that reflects likelihood that the detected business-aware concept is present in the first image. In some implementations, the result of the detecting operation 512/514 is a vector of scores each corresponding to a business-aware concept, where the score reflects a likelihood that (e.g., a probability that) the corresponding business-aware concept appears in the image content.

Next, the computing device generates (516) a first representation that corresponds to the first image based on the associated scores and based on one or more vectors of word representation for high-scoring business-aware concepts of the plurality of business-aware concepts. In some implementations, the high-scoring business-aware concepts are associated with an assigned score that is above a score threshold (e.g., 0.65, 0.7, 0.75 or a similar probability reflecting a high likelihood that the business-aware concept is present in the first image).

The computing device also receives (518) second representations that correspond to each of the one or more candidate business venues, and the second representations are based on the first set of textual reviews and the second set of stored images. The second representations may or may not be multimodal, depending on whether the candidate venue has any associated images in the database. In some implementations, receiving the second representations includes: detecting, based on an analysis of each stored image of the second set of stored images using the trained visual detectors, the plurality of business-aware concepts in a respective stored image, and each detected business-aware concept is associated with a score that reflects likelihood that the detected business-aware concept is present in the respective image. In some implementations, a respective second representation of a first candidate business venue is based on: (i) zero or more associated scores (i.e., zero scores if the first candidate business venue is not associated with any stored images) and (ii) one or more vectors of word representation for respective textual reviews that are associated with the first candidate business venue.

In some implementations, one or more of the second representations are pre-generated (or pre-computed), so that they do not need to be generated or re-generated with receiving operation 518. For example, upon receiving a new stored image that is associated with a respective business venue, the computing device (or a server, such as server 200, FIG. 2) generates a second representation for the respective business venue and stores the second representation for future use (thus saving processing time at operation 518). In some implementations, second representations for business venues are generated at pre-determined intervals (e.g., once per day, once per hour, or at some other interval that is designed to preserve computing resources at a server system or computing device). In some implementations, second representations for business venues are initially generated at pre-determined intervals (e.g., once per day, once per hour, or at some other interval that is designed to preserve computing resources at a server system or computing device) and are then later updated as new images or reviews are received for respective business venues. In some implementations, during operation 508 (FIG. 5), instead of retrieving textual reviews and stored images, the computing device retrieves pre-generated (or pre-computed) second representations for the one or more candidate business venues.

In accordance with determining (520) that the first representation is most similar to a respective second representation of a first candidate business venue, the computing device: (i) associates the first image with the first candidate business venue and (ii) provides an indication that the first image is associated with the first candidate business venue (e.g., a visual indication with a textual description that indicates that the first image was taken at the first candidate business venue or some other update to a database to reflect the association). In this way, the method 500 is able to associate the first image with the first business venue without focusing solely on comparing the first image to other images (e.g., since consumer photos are noisy and comprise many indoor images or images with general objects in human space, the image content taken at a business venue might not have unique low-level visual patterns distinguishing the first image from other images.) Therefore, rather than comparing low-level visual features in a query image (e.g., the first image) to existing database image (e.g., stored in the repository), the method represents image content in the query image and the other domains of data related to the same business venue with semantic concepts (e.g., by detecting presence of business-aware visual concepts within the first/query image). The semantic concepts can thus extend the visual content to word representations to match against stored textual data in a database (e.g., stored textual reviews 228 of database 112, FIG. 2).

In some implementations, determining that the first representation is most similar to a respective second representation of a first candidate business venue includes determining that the respective second representation is closest to the first representation in a multi-dimensional space of the plurality of business-aware concepts. In some implementations, the score indicates how well the concept describes some content within the image (e.g., coffee in focus in foreground of the image might get a higher score than the other concepts that are absent from the image). In some implementations, the first image is represented as a vector in a multi-dimensional space of the detected business-aware concepts and a distance between the representation of the first image and other objects (reviews and images) associated with each business venue in the repository is computed to find a business venue that best matches the first image (e.g., business venue with reviews/images that are closest to the representation of the first image in the multi-dimensional space).

In some implementations, before associating the first image with the first candidate business venue, the repository included no images that were associated with the first candidate business venue. In other words, the method 500 is able to match an image to a business venue based on word representations alone (e.g., identify visual concepts in the first image, generate word representations based on those visual concepts and match word representations for the first business venue based only on textual reviews associated with the first business venue, even though no images were currently available for the first business venue).

In some implementations, associating the first image with the first business venue includes sending the first image for storage in the repository.

In some implementations or circumstances, the received first image corresponds to an image taken in an indoor environment (disclosed implementations are particularly advantageous for indoor images). In other implementations or circumstances, the received first image corresponds to an image taken in an outdoor environment.

In some implementations, the repository of textual reviews and stored images associated with the plurality of business venues is maintained at a server system that is remotely located from the computing device.

Figures 6A, 6B:
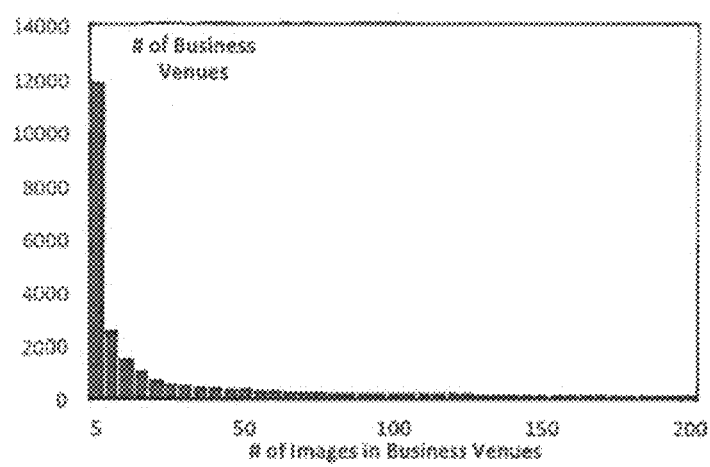
FIGS. 6A-6D provide analytical tables and charts that demonstrate performance of the systems and methods disclosed herein for associating images with business venues, in accordance with some implementations.
Figure 6C:
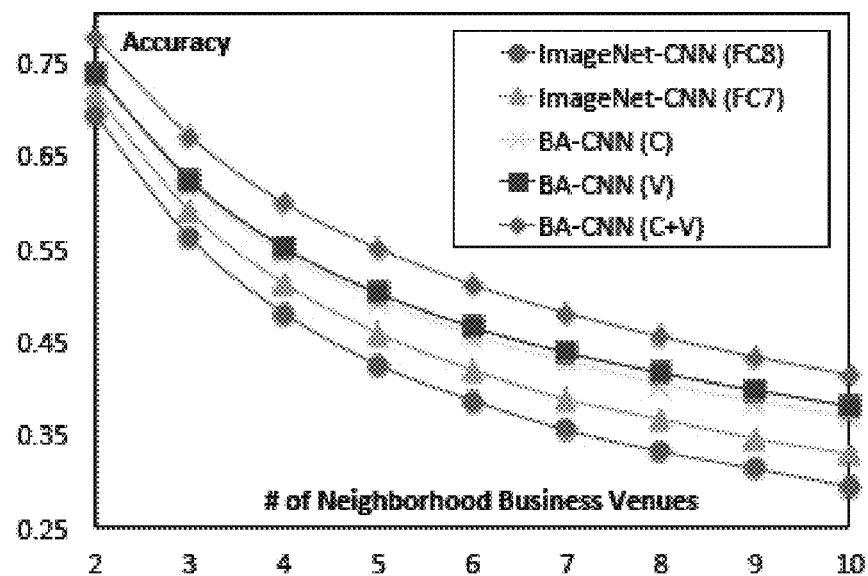

FIGS. 6A-6C provide analytical tables and charts that demonstrate performance and advantages of the systems and methods disclosed herein for associating images with business venues, in accordance with some implementations.

In particular, FIG. 6A shows the accuracy of business venue recognition over a business venue database with two domains of data, reviews (using word representation WordVec as the features) and images (using image representation learned by CNN as the features). Column 602 (labelled "Acc. @2") shows the accuracy when 2 venues are included in the list of candidate business venues. Column 604 (labelled "Acc. @5") shows the accuracy when 5 venues are included in the list of candidate business venues. Simply using text representation ("WordVec (Google News)") outperforms random guess, suggesting that concepts extracted from BA-CNN (C+V) indeed have semantic meaning. Word-Vec (Business-Aware) surpasses WordVec (Google News) demonstrating the importance of business awareness. And, BA-CNN (C+V)+WordVec reaches the best overall accuracy (78.5% and 56.1% with 2 and 5 candidate venues, respectively).

Because of data sparsity problems, the business venues in the database (e.g., database 112, FIG. 2) might not be associated with a sufficient number of images for robust image-based venue recognition. As shown in FIG. 6B, around 12,000 business venues (more than 50% over total venues) have fewer than 5 associated images.

FIG. 6C shows recognition accuracy as different numbers of neighboring business venues are considered as candidate business venues. As shown in FIG. 6C, when there are more business venues nearby, performance accuracy drops because business venue identification becomes more difficult. As is also shown in FIG. 6C, across any number of neighboring business venues, BA-CNN (C+V) outperforms all other models consistently.

Figure 6D:
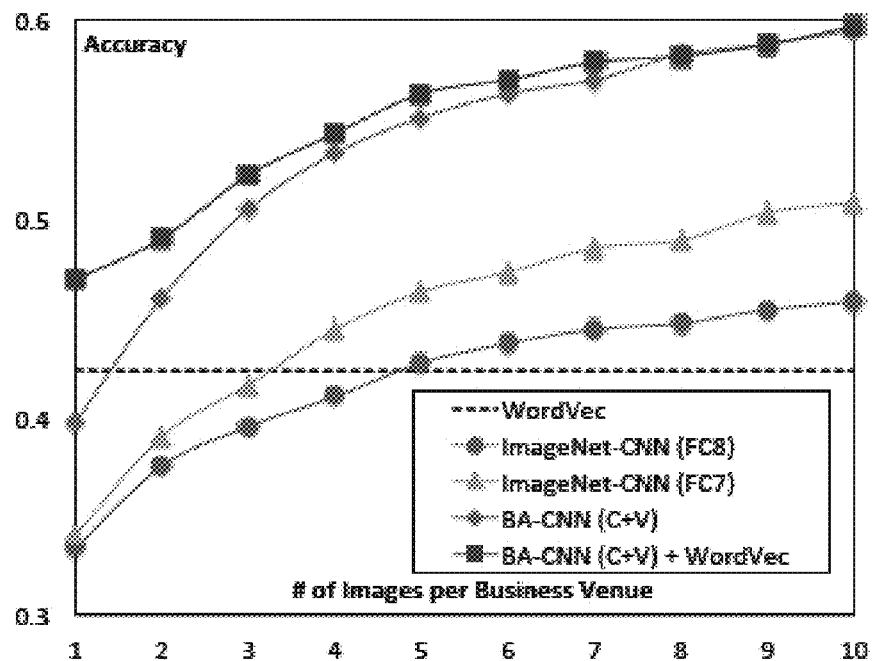

FIG. 6D shows how the multimodal business venue recognition can help to deal with data sparsity problem. When images of business venues in the database are not sufficient (e.g., <5 per business venue), the multimodal recognition (BA-CNN (C+V)+WordVec) has larger improvements than that relying on image only (BA-CNN). When each venue in the database has only one image, matching the text of reviews only (WordVec) is even more accurate than matching the database image (BA-CNN (C+V)), and the multimodal business venue recognition (BA-CNN (C+V)+WordVec) still performs the best.

As noted above, high-level semantic concepts (e.g., business-aware concepts) are common in more data domains beyond simply images, e.g., words in reviews. This association extends pure visual content to multimodal feature representations—visual concept representation and word representation—and allows a test image (without text) to be associated with multimodal information sources on the Web (e.g., images and reviews) for business venue recognition, defined as multimodal business venue recognition in this work. Multimodal business venue recognition is more accurate than single modal recognition. Furthermore, it is more robust to the data sparsity problem than single modal recognition. For example, when images of business venues are very few or not available in the database, image-based recognition is not applicable but the multimodal recognition disclosed herein still works because it can leverage other available data (such as reviews) associated with the target business venues.

Although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. The term "and/or" as used herein refers to and encompasses any and all possible combinations of one or more of the associated listed items. The terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method of associating an image with a business venue, the method comprising:

at a computing device having a display, one or more input devices, one or more processors, and memory:

receiving, via the one or more input devices, a first image that is associated with a particular geographic area;

retrieving, from a repository that includes user-submitted textual reviews and stored images associated with a plurality of business venues, a first set of user-submitted textual reviews and a second set of stored images that are associated with one or more candidate business venues of the plurality of business venues, wherein each business venue of the one or more candidate business venues is located within a predetermined distance of the particular geographic area;

detecting, based on an analysis of the first image using trained visual detectors, a plurality of business-aware concepts in the first image, wherein each detected business-aware concept is associated with a score that reflects likelihood that the detected business-aware concept is present in the first image;

generating a first representation that corresponds to the first image based on the associated scores and based on one or more word representations for high-scoring business-aware concepts of the plurality of business-aware concepts;

receiving second representations that correspond to each of the one or more candidate business venues, wherein the second representations are based on the first set of user-submitted textual reviews and the second set of stored images; and in accordance with determining that the first representation is most similar to a respective second representation of a first candidate business venue, (i) associating the first image with the first candidate business venue and (ii) providing an indication that the first image is associated with the first candidate business venue.

2. The method of claim 1, wherein receiving the second representations includes:

detecting, based on an analysis of each stored image of the second set of stored images using the trained visual detectors, the plurality of business-aware concepts in a respective stored image, wherein each detected business-aware concept is associated with a score that reflects likelihood that the detected business-aware concept is present in the respective image, and further wherein a respective second representation of a first candidate business venue is based on: (i) zero or more associated scores and (ii) one or more word representations for respective user-submitted textual reviews that are associated with the first candidate business venue.

3. The method of claim 1, wherein each concept of the plurality of business-aware concepts satisfies the following conditions: (i) the respective concept is business aware; (ii) the respective concept is visually consistent; and (iii) the respective concept is discriminative for business venue recognition.

4. The method of claim 1, wherein the plurality of business-aware concepts are identified by mining texts and images associated with business venues to identify the business-aware concepts.

5. The method of claim 1, wherein the trained visual detectors are trained by using images that are relevant to the plurality of business-aware concepts and constructing visual concept detectors that are configured to match visual concepts in a query image with one or more of the business-aware concepts.

6. The method of claim 5, wherein the trained visual detectors are trained before receiving the first image.

7. The method of claim 1, wherein, before associating the first image with the first candidate business venue, the repository included no images that were associated with the first candidate business venue.

8. The method of claim 1, wherein the provided indication includes a visual indication with a textual description indicating that the first image was taken at the first candidate business venue.

9. The method of claim 1, wherein determining that the first representation is most similar to a respective second representation of a first candidate business venue includes determining that the respective second representation is closest to the first representation in a multi-dimensional space of the plurality of business-aware concepts.

10. The method of claim 1, wherein, before receiving the first image, the plurality of business-aware concepts are identified by analyzing images and user-submitted textual reviews associated with business venues to locate those concepts that satisfy the following conditions: (i) the respective concept is business aware; (ii) the respective concept is visually consistent; and (iii) the respective concept is discriminative for business venue recognition.

11. The method of claim 1, wherein associating the first image with the first business venue includes sending the first image for storage in the repository.

12. The method of claim 1, wherein the received first image corresponds to an image taken in an indoor environment.

13. The method of claim 1, wherein the received first image corresponds to an image taken in an outdoor environment.

14. The method of claim 1, wherein the particular geographic area is associated with rough coordinates at which the first image was taken.

15. The method of claim 1, wherein the particular geographic area is determined based on Wi-Fi signals detected by the computing device when the first image was taken.

16. The method of claim 1, wherein the first representation is a multimodal representation of the first image.

17. The method of claim 1, wherein the high-scoring business-aware concepts are associated with an assigned score that is above a score threshold.

18. The method of claim 1, wherein the repository of user-submitted textual reviews and stored images associated with the plurality of business venues is maintained at a server system that is remotely located from the computing device.

19. A non-transitory computer-readable storage medium storing one or more programs, the one or more programs comprising instructions which, when executed by a computing device with a display, one or more input devices, one or more processors, and memory, cause the computing device to:
- receive, via the one or more input devices, a first image that is associated with a particular geographic area;
- retrieve, from a repository of user-submitted textual reviews and stored images associated with a plurality of business venues, a first set of user-submitted textual reviews and a second set of stored images that are associated with one or more candidate business venues of the plurality of business venues, wherein each business venue of the one or more candidate business venues is located within a predetermined distance of the particular geographic area;
- detect, based on an analysis of the first image using trained visual detectors, a plurality of business-aware concepts in the first image, wherein each detected business-aware concept is associated with a score that reflects likelihood that the detected business-aware concept is present in the first image;
- generate a first representation that corresponds to the first image based on the associated scores and based on one or more word representations for high-scoring business-aware concepts of the plurality of business-aware concepts;
- receive second representations that correspond to each of the one or more candidate business venues, wherein the second representations are based on the first set of user-submitted textual reviews and the second set of stored images; and
- in accordance with determining that the first representation is most similar to a respective second representation of a first candidate business venue, (i) associate the first image with the first candidate business venue and (ii) provide an indication that the first image is associated with the first candidate business venue.

20. A computing device, comprising:
a display;
one or more input devices;
one or more processors;
memory; and
one or more programs, wherein the one or more programs are stored in the memory and configured to be executed by the one or more processors, the one or more programs including instructions for:
- receiving, via the one or more input devices, a first image that is associated with a particular geographic area;
- retrieving, from a repository of user-submitted textual reviews and stored images associated with a plurality of business venues, a first set of user-submitted textual reviews and a second set of stored images that are associated with one or more candidate business venues of the plurality of business venues, wherein each business venue of the one or more candidate business venues is located within a predetermined distance of the particular geographic area;
- detecting, based on an analysis of the first image using trained visual detectors, a plurality of business-aware concepts in the first image, wherein each detected business-aware concept is associated with a score that reflects likelihood that the detected business-aware concept is present in the first image;
- generating a first representation that corresponds to the first image based on the associated scores and based on one or more word representations for high-scoring business-aware concepts of the plurality of business-aware concepts;
- receive second representations that correspond to each of the one or more candidate business venues, wherein the second representations are based on the first set of user-submitted textual reviews and the second set of stored images; and
- in accordance with determining that the first representation is most similar to a respective second representation of a first candidate business venue, (i) associating the first image with the first candidate business venue and (ii) providing an indication that the first image is associated with the first candidate business venue.

* * * * *